(12) United States Patent
Gruttadauro

(10) Patent No.: US 12,162,394 B2
(45) Date of Patent: Dec. 10, 2024

(54) VEHICLE FLOOR COVERING SYSTEM

(71) Applicant: Tarboy LLC, Addison, IL (US)

(72) Inventor: Salvatore Gruttadauro, Lombard, IL (US)

(73) Assignee: Tarboy LLC, Addison, IL (US)

( * ) Notice: Subject to any disclaimer, the term of this patent is extended or adjusted under 35 U.S.C. 154(b) by 0 days.

(21) Appl. No.: 18/144,400

(22) Filed: May 8, 2023

(65) Prior Publication Data

US 2023/0311736 A1    Oct. 5, 2023

Related U.S. Application Data

(62) Division of application No. 17/496,740, filed on Oct. 7, 2021, now Pat. No. 11,642,996.

(51) Int. Cl.
*B60N 3/00* (2006.01)
*B60N 3/04* (2006.01)

(52) U.S. Cl.
CPC ............. *B60N 3/046* (2013.01); *B60N 3/048* (2013.01)

(58) Field of Classification Search
None
See application file for complete search history.

(56) References Cited

FOREIGN PATENT DOCUMENTS

DE          19805949 A1 *  8/1999  ............. B60N 3/046
WO       WO 91/16218   * 10/1991

* cited by examiner

*Primary Examiner* — Alexander S Thomas
(74) *Attorney, Agent, or Firm* — Niro McAndrews, LLP

(57) ABSTRACT

A vehicle floor mat system comprising a vehicle floor tray molded from an extrusion polymer sheet, a vehicle floor mat affixation device containing a circular shaped body with axial extending tines, and a removable carpet attachment is disclosed. The vehicle floor mat system resists affixation device pull-out and shear forces applied to the mat with respect to the original equipment manufacturer's floor covering on which the mat is placed but allows for easy removal and replacement of the vehicle floor mat and of the affixation devices.

18 Claims, 34 Drawing Sheets

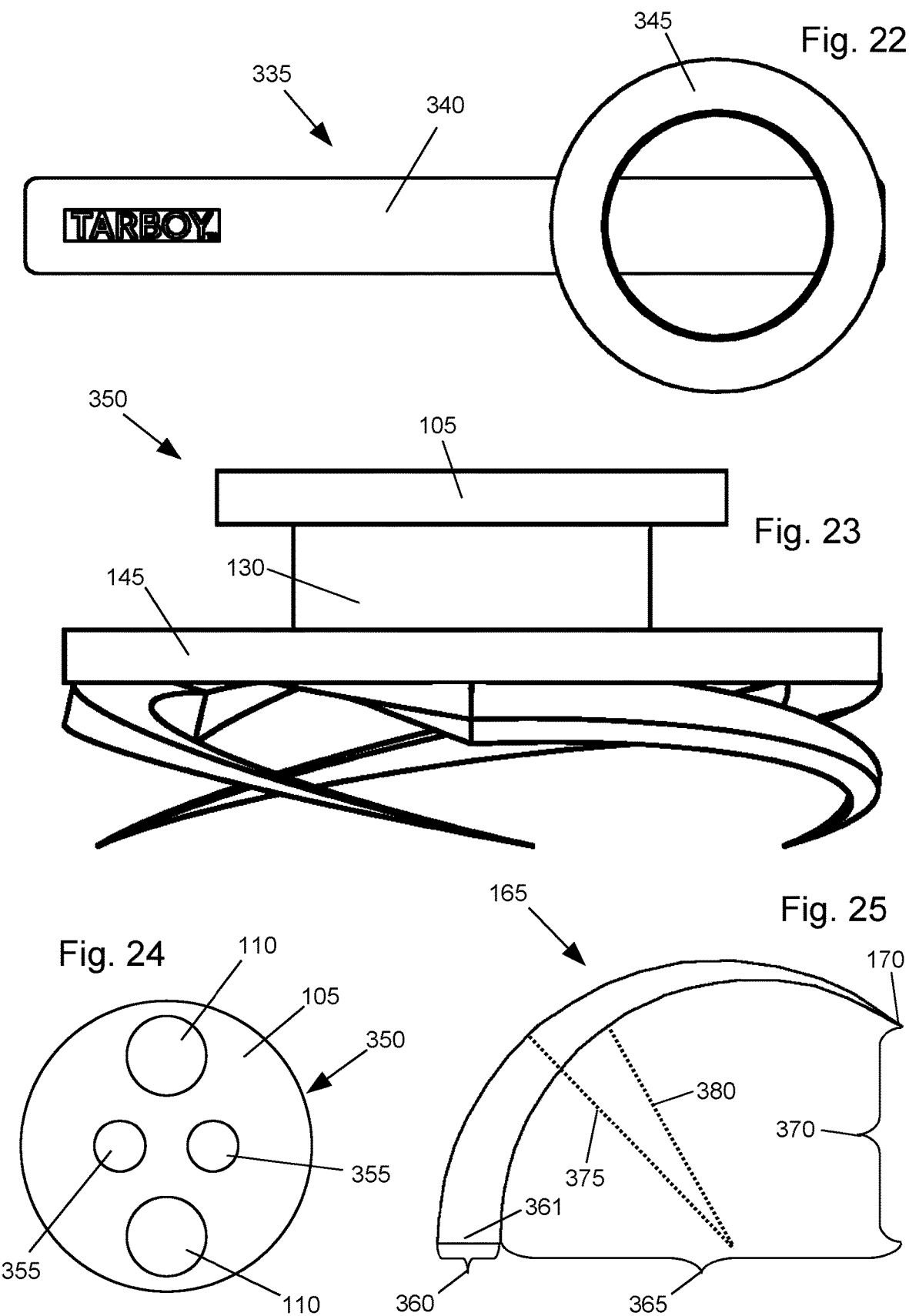

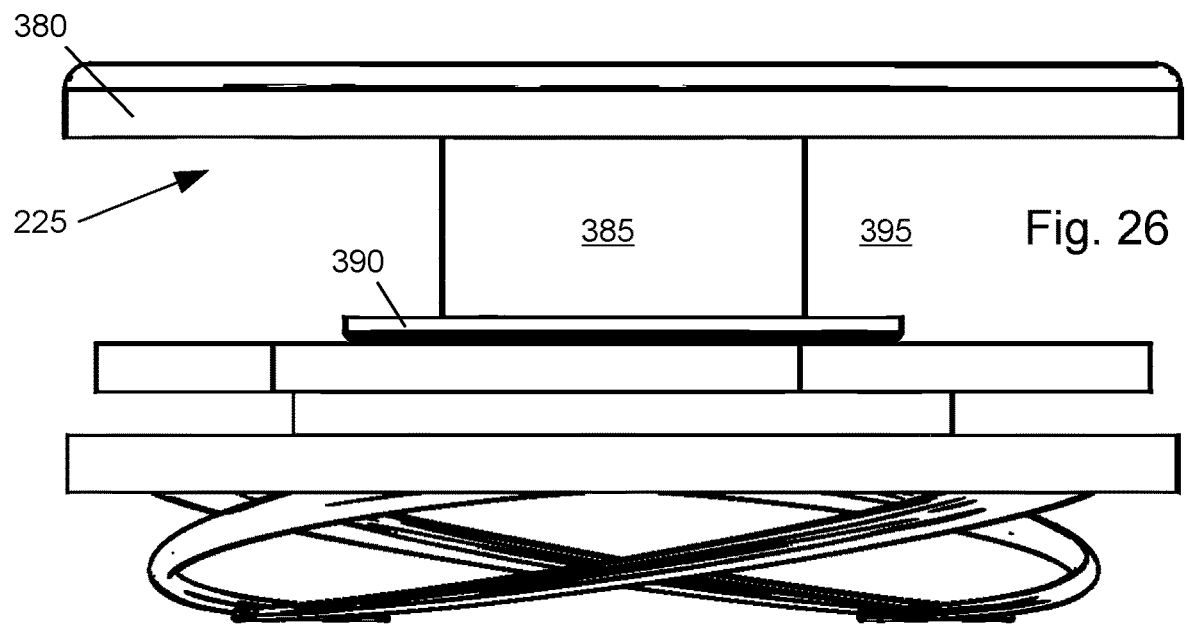
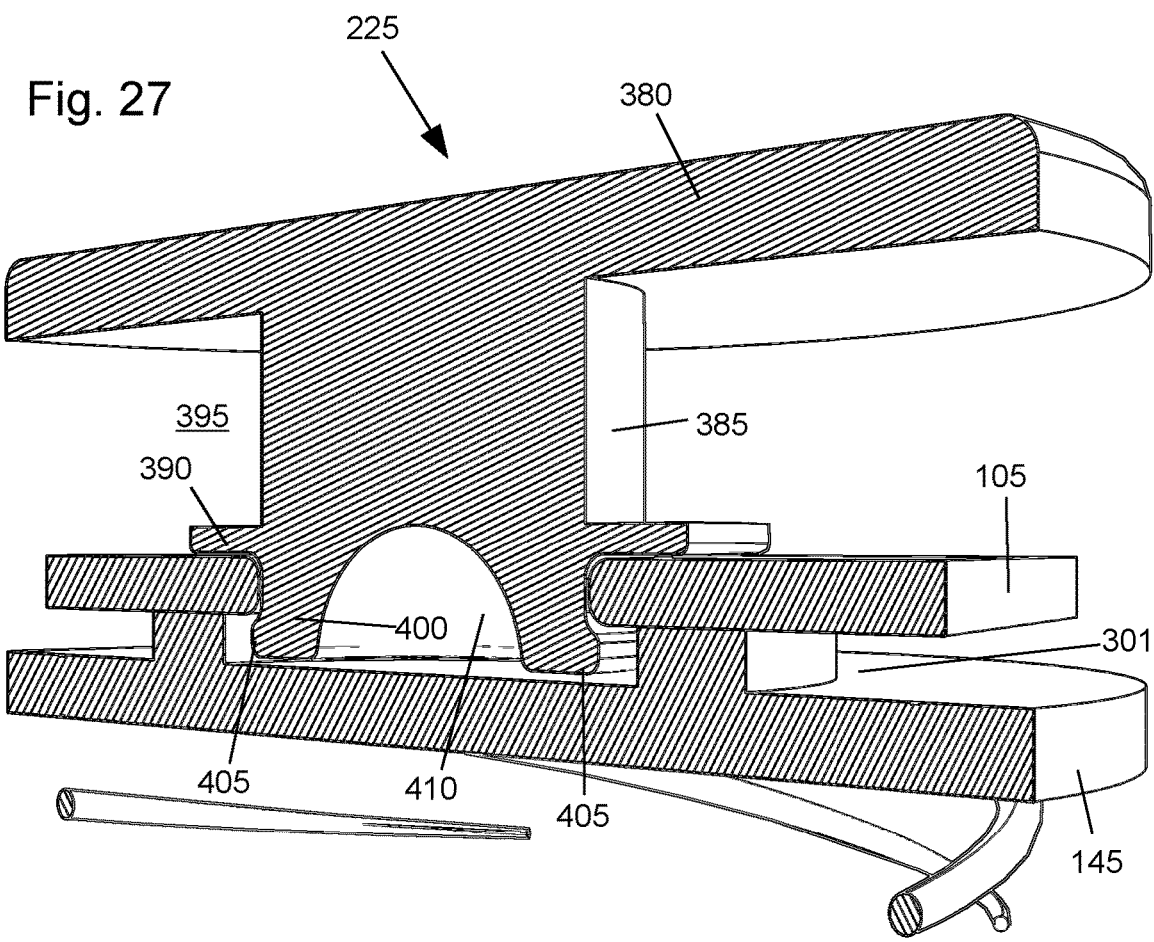

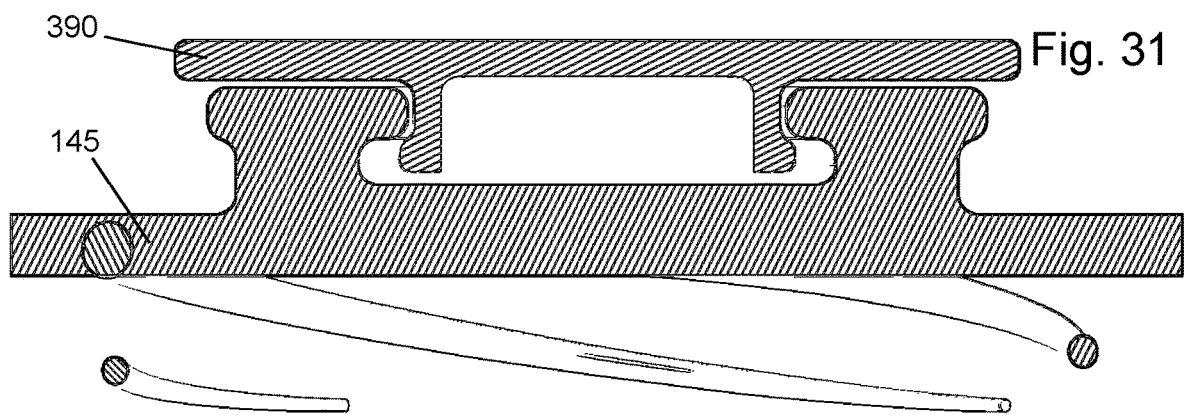
Fig. 31
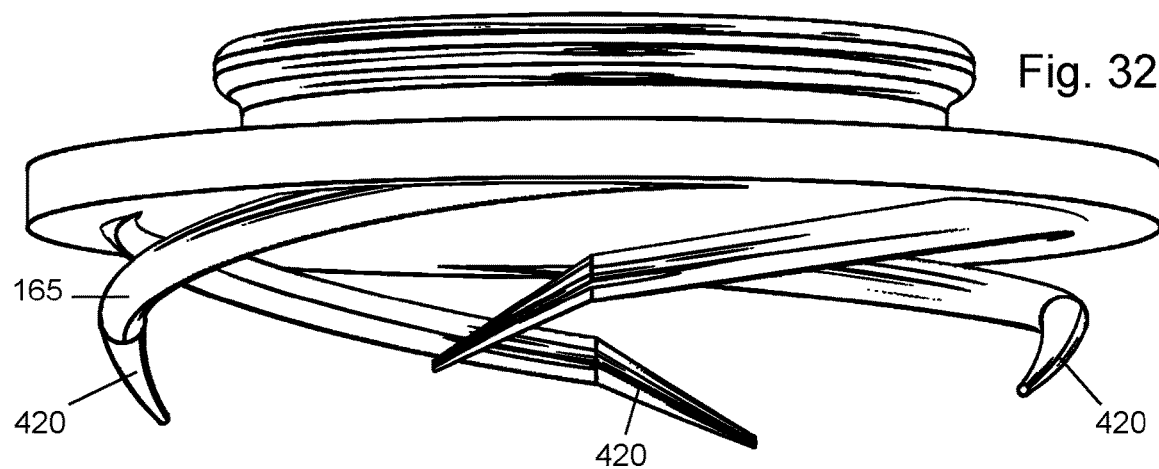
Fig. 32
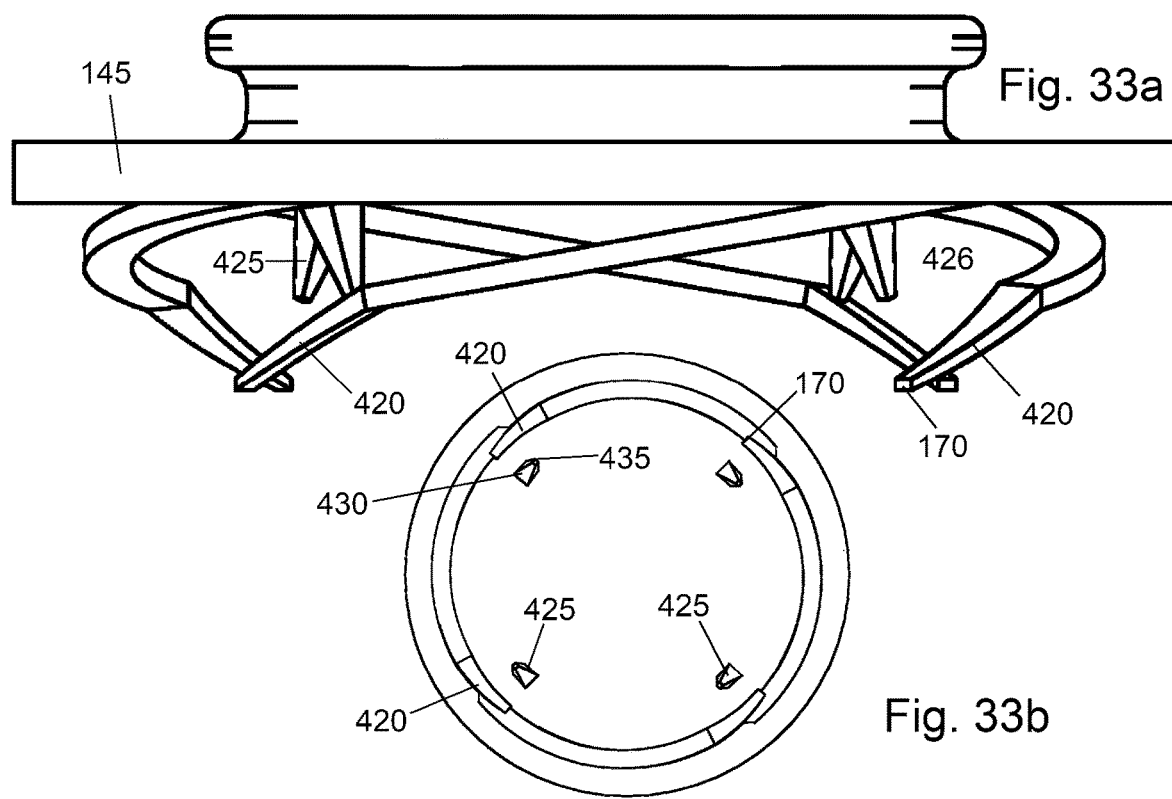
Fig. 33a
Fig. 33b

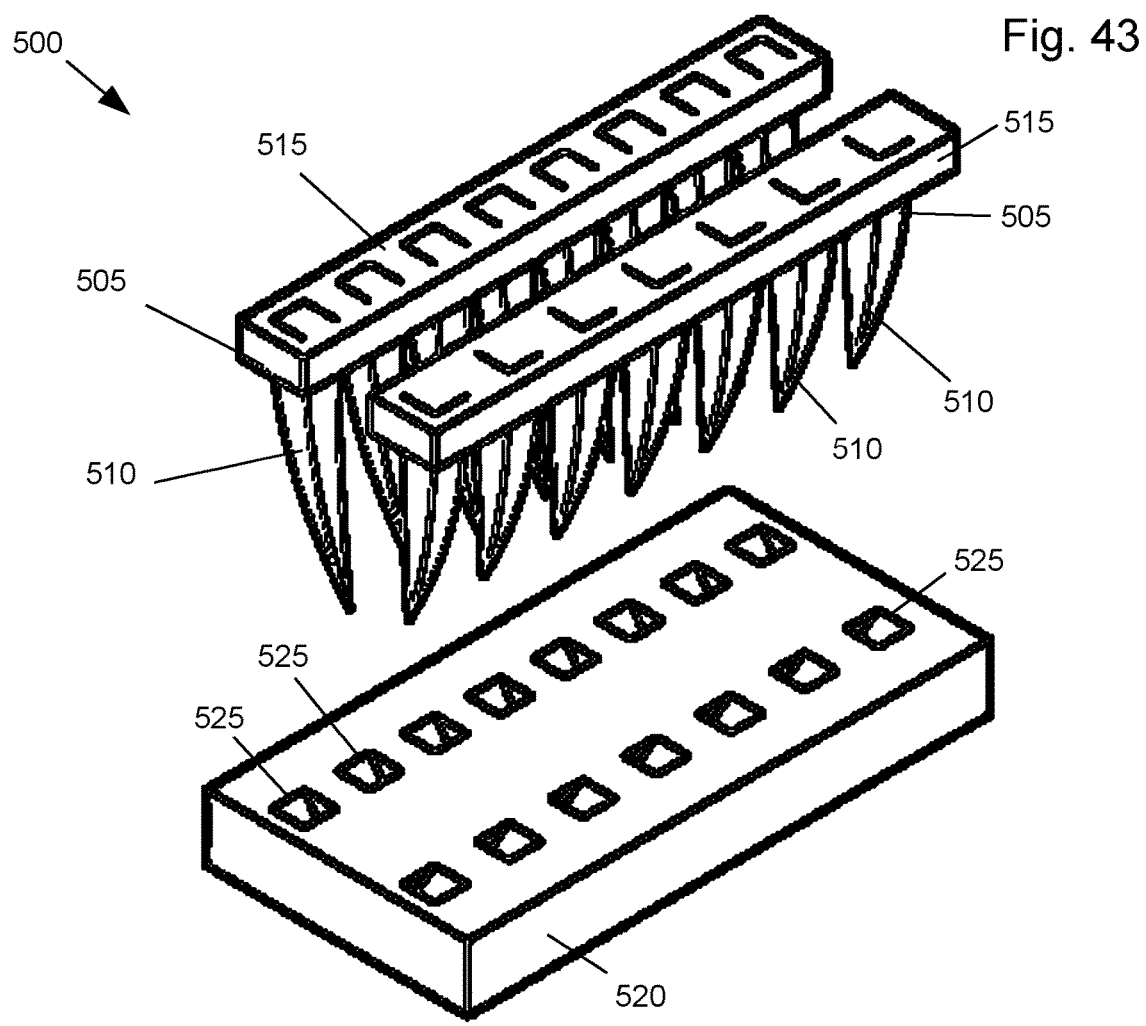
Fig. 43
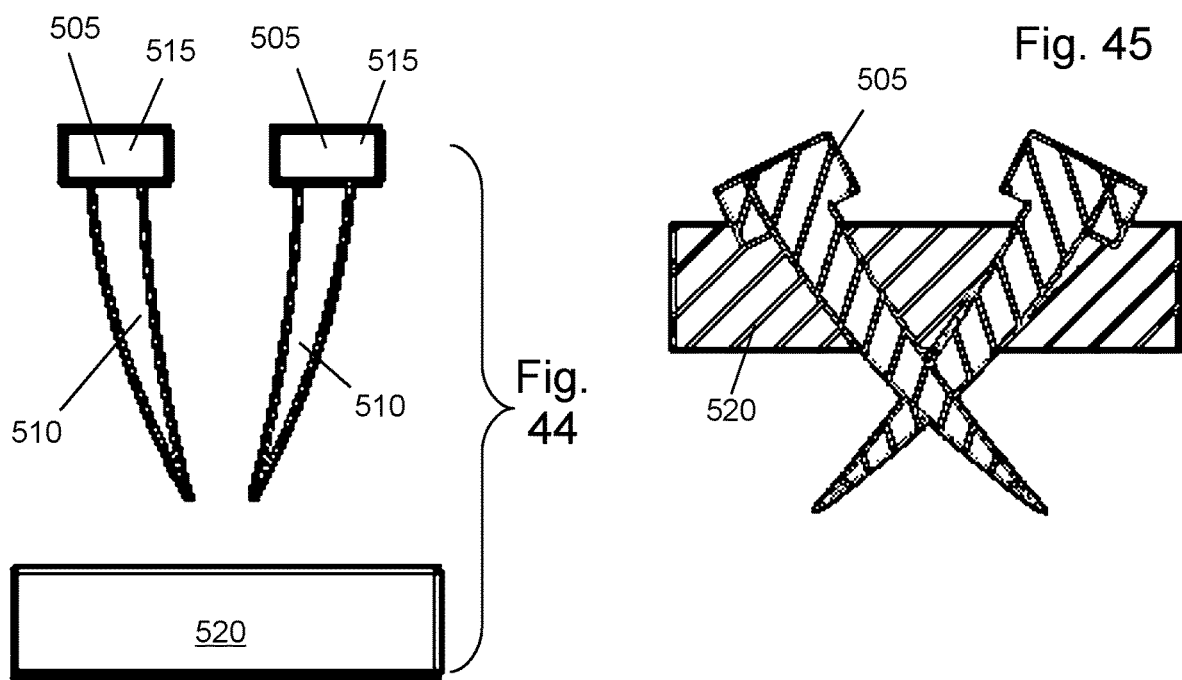
Fig. 44
Fig. 45

VEHICLE FLOOR COVERING SYSTEM

REFERENCE TO CO-PENDING APPLICATION

This application is a divisional of U.S. patent application Ser. No. 17/496,740 entitled "Vehicle Floor Covering System" that was filed on Oct. 7, 2021 and issued on May 9, 2023 as U.S. Pat. No. 11,642,996, the contents of which are all herein incorporated by reference.

FIELD OF THE INVENTION

The present invention relates in general to fasteners, and more particularly to systems, devices, and methods for releasably securing removable floor mats to the floor covering of vehicles.

BACKGROUND OF THE INVENTION

Motor vehicles are typically driven outdoors, and it is common for their occupants to have wet or dirty feet, especially in cold or wet climates. In order to protect the permanently installed vehicle interior surfaces from getting soiled and prematurely worn from moisture and dirt, owners have used removable vehicle floor mats for decades. As foot motion is a requirement of vehicle operation, vehicle occupants tend to push around these floor mats with their feet. This, however, causes several undesirable and rather dangerous conditions in which the floor mat can be pushed up to obstruct the gas, brake, or clutch pedals.

Floor mat manufacturers have noted that footwells of cars, trucks, and SUVs vary in size and shape; therefore, it is necessary for floor mats to approximately conform to the shape of the bottom surface of the footwell in order to prevent them from shifting. Most front-seat automobile footwells are concave in nature and have a number of complex curved surfaces. These three-dimensional cavities have steered vehicle manufacturers and manufacturers of after-market automotive products to create floor trays with sidewalls and fluid reservoirs that offer increased protection of the vehicle floor. Conventional vehicle floor liners are usually molded from poly-ply rubber, plastic, or synthetic material so that the liner can maintain a level of rigidity so as to sustain a three-dimensional shape, yet still remain somewhat flexible for easy removal. Oftentimes, the selection of this material is regulated by its cost, tensile strength, how slippery it is against the vehicle occupants' feet, and its endurance against shear forces.

Most vehicle manufacturers and manufacturers of after-market automotive products design floor trays with various reservoirs, channels, treads, or valleys that retain moisture until the moisture naturally evaporates or can be disposed of by the vehicle owner. Some designs even position channels in the center of the reservoir, so that the feet of the occupant are held above any liquid that the floor tray gathers. However, these designs limit how easily the floor tray can be cleaned. Therefore, a long-felt need still exists in the market for a floor tray that will have an exact fit to the vehicle footwell, that stays in place once it is installed, and that is easily cleaned once removed by the vehicle owner or user.

It has proven difficult for conventional floor trays to fit and remain stationary when exposed to foot traffic within the intricate three-dimensional surface of the vehicle footwell; therefore, the products that are currently offered in the marketplace have limited consumer acceptance. Vehicle owners tend to dislike floor trays that deform, shake, and move about, so as to further prevent the slipping and sliding of conventional vehicle floor mats on carpeted or vinyl floors. In an effort to address these issues, various affixation devices have been developed, such as the anchoring device shown in U.S. Pat. No. 6,735,819 issued to MacNeil IP LLC, the contents of which are herein incorporated by reference, including the fastener shown in FIGS. 1-3, 5, 7-9, and their associated descriptions in the specification. This device uses an axial extending connector to secure the vehicle floor tray to the vehicle floor. Nevertheless, this conventional device and others like it have a serious drawback of deforming during installation, thus not holding the intended object down to the vehicle floor securely or being able to be re-used after removal. A need, therefore, still exists for an easy to clean vehicle floor mat that conforms to the vehicle footwell and has a reusable anchoring device which (1) can easily be installed and removed by the consumer and (2) provides considerable resistance to shifting of the mat with respect to the floor.

SUMMARY OF THE INVENTION

The various embodiments of the present invention overcome the shortcomings of the prior art. The present invention provides an automotive floor mat structure disposed at an intra-vehicular foot resting area inside a vehicle. The floor mat structures are not only conducive to prevent the intrusion of water, mud, snow, rocks, rock salt, or foreign bodies into automobiles, but are also unlikely to be shifted when the vehicle's occupants' feet come into contact with the foot resting area.

In a preferred embodiment of the present invention, a semi-rigid floor liner is affixed to the original equipment manufacturer's ("OEM") footwell covering by a tortional reusable anchor and a replaceable absorbent fabric layer, configured to catch liquid and debris, which is then connected to the liner via a snap or other positive connection into the top surface of the reusable anchor. An embodiment of the invention provides for a vehicle floor cover, mat, liner, or tray which is easily installable by a vehicle user and is formed of thermoplastic polymer materials. In one embodiment of the invention, the liner is constructed from materials that have a Shore A hardness range between 10 and 100. The Shore A Hardness Scale measures the hardness of flexible mold rubbers that range in hardness from very soft and flexible, to medium and somewhat flexible, to hard with almost no flexibility at all. Semi-rigid plastics can also be measured on the high end of the Shore A Scale. In another embodiment of the invention, the surfaces of the tray floor in the liner are completely smooth with a profile not to exceed 0.0625 inches from the highest to the lowest surface, and the liner possesses no inside or outside corners, valleys, sharp edges, channels, grooves, or indentations other than required by the OEM floor contour throughout the entire liner assembly. The automotive floor liner structure conforms to the surface of the vehicle footwell for which it is provided and has multiple upstanding walls extending from the tray floor to an edge. These wall surfaces can be adjacent or opposite each other and conform to the footwell surfaces which they cover. In a further embodiment of the invention, the top edge of the vehicle floor tray is coplanar with the sidewalls thereof. This ensures that all facets of the vehicle footwell are sufficiently protected from soiled shoes. In a preferred embodiment, the tray is at least five inches deep at its deepest part.

In a still further embodiment of the invention, the reusable anchoring device has a circular body with a central axis and a radius of ½ to 1½ inches that extends from the central axis to the edge of the body. In another embodiment of the invention, the reusable anchoring has a radius no less than ⅜ of an inch. The radius allows for the rotation of the reusable anchor about the axis by a human hand utilizing a thumb key tool. The device also has axially extending tines connected to the bottom face of the body. The axially extending tines are introduced into the vehicle floor covering by the clockwise turn of the thumb key tool that has been inserted into the predetermined hole located on the top face of the device, thereby securing the device to the vehicle floor.

The reusable anchoring device is a component of a system of multiple anchors and often includes at least four reusable anchors for releasably affixing an item to a floor of a vehicle. In an affixation method according to the invention, the reusable anchor devices are manually positioned such that the bottom face of the flat circular body is adjacent to an upper surface of the floor of the vehicle. The opposite end of the axially extending connector faces the upper surface of the floor of the vehicle. The reusable anchoring device is pressed toward the upper surface of the floor of the vehicle and manually rotated clockwise to secure the device and floor liner to the floor of the vehicle. The surface alignment and tension between the reusable anchoring devices and the floor liner after the completion of installation prevents moisture or dirt from passing through the liner holes and onto the OEM vehicle floor covering.

The placement of the reusable anchoring devices is based on the structure of the removable absorbent machine washable insert discussed below. The holes in the vehicle liner are placed in such a way that they align with the pre-welded clips on the underside of the removable fabric insert and avoid interfering with any OEM vehicle structures that may be located underneath the OEM vehicle covering. Furthermore, a plurality of side wall panel reusable anchors may be installed in a pattern with not less than one per six lateral inches away from the prior reusable anchor and a distance not greater than three inches from the top edge of adjacent reusable anchor.

Another embodiment of the present invention provides a removable absorbent machine washable insert that has a fabric layer and a water-proof material defining a bottom surface. The bottom surface of the insert has a plurality of fastening devices that are welded not less than 4 inches from the perimeter of the removable insert. The fastening devices precisely align with the reusable anchoring devices installed within the floor liner and are able to snap onto the anchoring devices when pressed toward the upper surface of the anchoring devices. The fabric insert can simply be removed when soiled to be washed by a consumer by grasping one corner of the insert at a time and firmly pulling upward.

BRIEF DESCRIPTION OF THE DRAWINGS

FIG. 22 is a plan view of the hand tool shown in FIG. 20.

FIG. 23 is an elevational view of a miniature anchoring device.

FIG. 24 is a plan view of a miniature anchoring device.

FIG. 25 is a sectional view of a tine used in a miniature anchoring device.

FIG. 26 is an elevational view of an anchoring device secured to a clip.

FIG. 27 is a cross-sectional view of an anchoring device secured to a clip.

FIG. 31 is a cross-sectional view of an anchoring device secured to a fourth embodiment of a clip.

FIG. 32 is a perspective view of an anchoring device with tapering tines having a circular cross-section.

FIG. 33a is an elevational view of an anchoring device having tine with rectangular cross-sections and reverse needles.

FIG. 33b is a plan view of an anchoring device having tine with rectangular cross-sections and reverse needles.

FIG. 43 is a perspective view of an anchoring device with hair-comb style tines.

FIG. 44 is an elevational view of an anchoring device with hair-comb style tines.

FIG. 45 is a cross-sectional view of an anchoring device with hair-comb style tines.

DETAILED DESCRIPTION

The disclosed vehicle floor covering system may be used with any type of vehicle and is particularly suited for applications where the floor covering is not installed by the OEM of the vehicle. The improved vehicle floor covering system may be used with any vehicle such as cars, trucks, boats, and personal aircraft. However, for descriptive purposes, the floor covering system will be described in use with a car or a truck.

Figure 1:
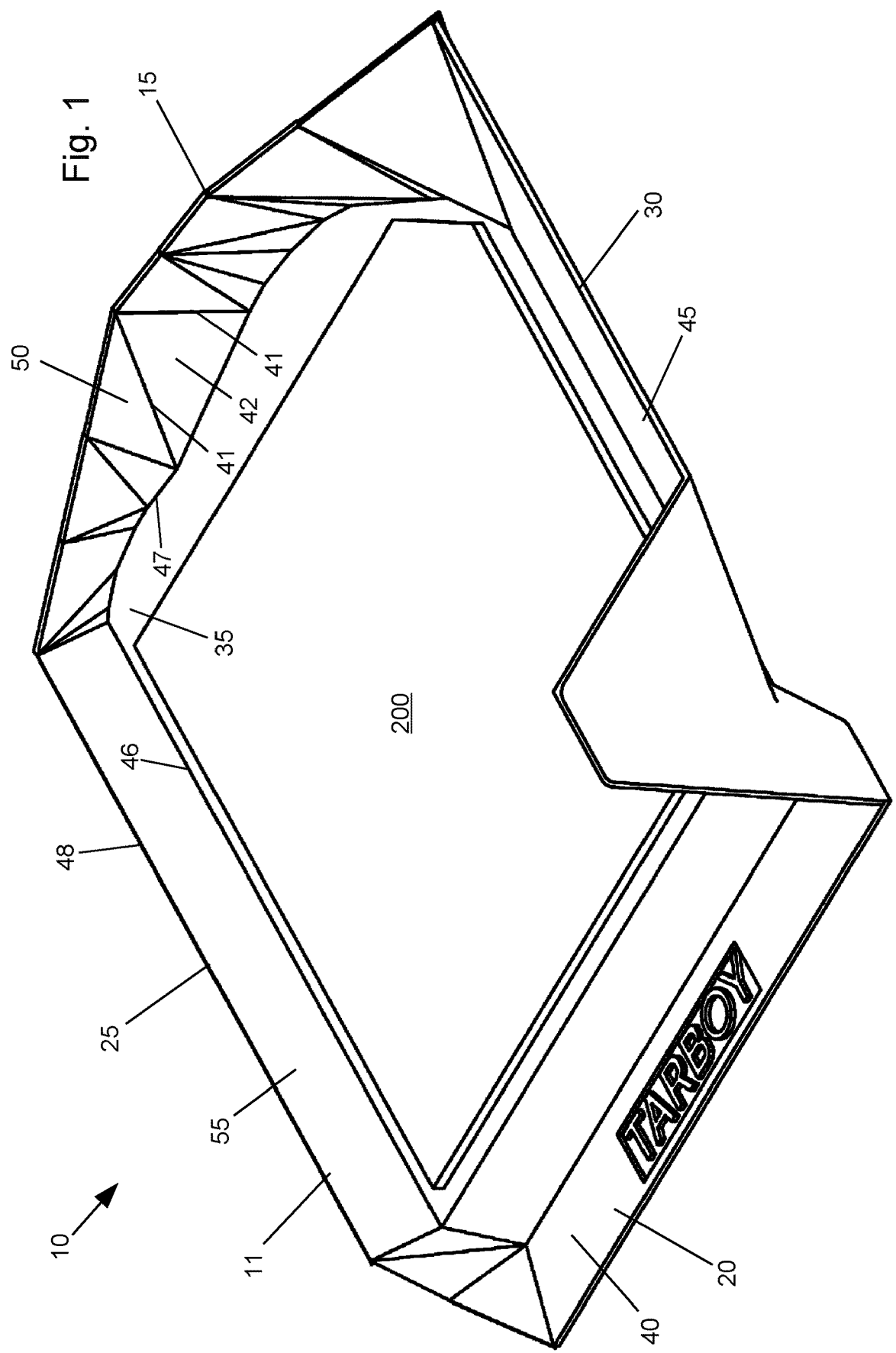
FIG. 1 is an isometric view of an assembled vehicle floor mat system.
Figure 2:
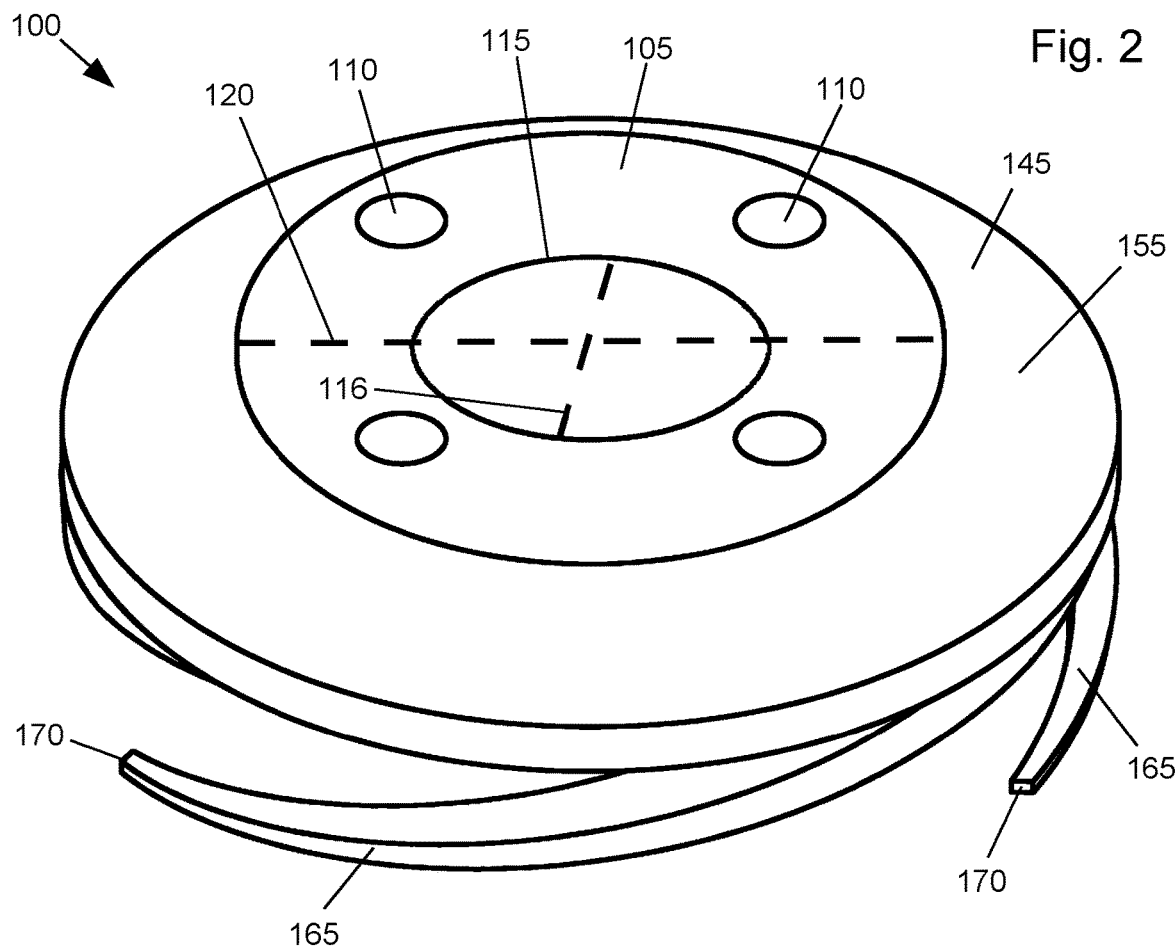
FIG. 2 is an isometric view of a vehicle affixation device illustrating a first surface thereof.
Figure 3:
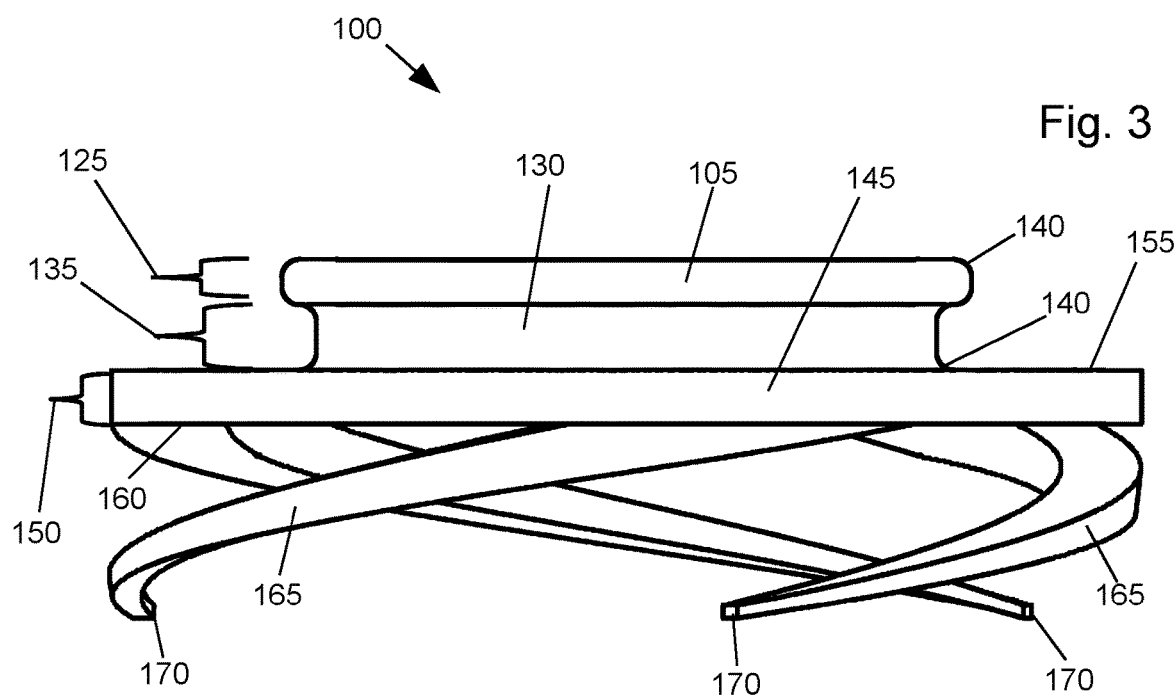
FIG. 3 is an elevational view of the vehicle affixation device shown in FIG. 2.

FIG. 1 shows a vehicle floor covering system 10 that is made in a shape so that it does not intrude or interfere with the driver's pedals or foot placement. It is specifically molded to the shape of the area in the vehicle in which it is to be placed. Most vehicles have either carpeting or vinyl in the footwell area, and this floor liner is intended to be placed on top of the carpeting or vinyl. The illustrated vehicle floor tray is molded from a thermoplastic material having relatively uniform thickness; however, it is common knowledge in the field that thermoplastic materials thin out nonuniformly and, in order to control thinning during thermoforming, various techniques, such as plug-assist forming, may have to be used. It is also common knowledge in the thermoforming field that because of how thermoplastic materials thin at sharp corners, it is important to have curved transitions when thermoforming parts thereof.

The vehicle floor covering system 10 has a liner 11 with a front side 15 and a back side 20 (or rear side). The back side 20 of the floor covering system is generally configured to be positioned adjacent to the vehicle seat while the front side 15 may be configured to be positioned adjacent to driver control pedals. Between the front side 15 and back side 20 are the left and right sides (25, 30, respectively) of the floor covering system 10. The floor covering system 10 includes a smooth central panel 35 (or central portion) that is shown in FIG. 1 without any grooves, channels, or reservoirs. A series of upright side wall panels (40, 45, 50, 55) perfectly contour to the shape of the vehicle footwell and form the front, left, and right sides (15, 25, 30) of the floor covering system 10. Due to varying shapes and dimensions of vehicle footwells, the shape and angle of the sidewalls will vary among vehicle models. A fabric insert 200 is secured to the liner 11. In one embodiment of the invention, the fabric insert 200 is configured to cover between 50% and 99% of the smooth central panel 35. In another embodiment of the invention, the fabric insert 200 is between 75% and 95% of the size of the central panel 35. In a third embodiment, the fabric insert 200 is about nine-tenths the size of the central panel 35.

The term "front" is herein defined to be the portion, section, or area oriented or configured to be oriented towards the standard direction of travel for a vehicle. For a boat, this would be the portion towards the bow. In a car, the front is towards the headlights and, in a plane, the area towards the nose cone. The term "rear" is herein defined to be the portion, section, or area oriented or configured to be oriented away from the standard direction of travel (e.g., towards the stern in a boat or taillights in a car). If the vehicle is operating in a non-standard manner (e.g., a car traveling in reverse), the front may travel behind the rear. The terms "top," "up," and "upper" are herein defined to be the portion, section, direction, or area oriented or configured to be oriented away from an OEM footwell during the standard operation of a vehicle. The terms "bottom," "down," and "lower" are herein defined to be the portion, section, direction, or area oriented or configured to be oriented towards an OEM footwell during the standard operation of a vehicle. If the vehicle is operating in a non-standard manner (e.g., an airplane flying inverted), a top portion may be located below a bottom portion.

In the illustrated embodiment in FIG. 1, the wall panels include a back wall panel 40 that is disposed adjacent to the bottom of the vehicle's front seat, an inner side wall panel 45 that exactly fits along a transmission tunnel, a forward wall panel 50 that exactly contours to the vehicle firewall, and a kick plate panel 55 opposite the inner side wall panel 45. In the illustrated embodiment, the liner 11 is precisely fitted to the vehicle footwell in which it is designed to be placed. The side wall panels (40, 45, 50, 55) of the liner 11 are formed so that they exactly conform to the automobile's surfaces against which they are positioned. In an exemplary embodiment, one hundred percent of the outer surface of the side wall panels (40, 45, 50, 55) and central panel 35 are no more than 0.00 inches from the corresponding surfaces that they are formed to mate with. This exact fit occurs even when the underlying automobile surface is curved or angled. In another embodiment of the invention, the central panel 95 has a width that is greater than the adjacent width of the OEM footwell. In one example, the central panel 95 has a width that is 101% of the width of the OEM footwell. By having the central panel 95 of the liner 11 be slightly larger than the OEM footwell, a snug fit of the liner into the footwell is facilitated. In the illustrated example, the side wall panels (40, 45, 50, 55) include a plurality of internal edges 41 that define facets 42 of the side wall panels that are aligned with the underlying automobile surface. In an alternative embodiment of the invention, the side wall panels have Bezier surfaces rather than edges to align with the underlying automobile surface.

The conformance of the tray side panels to respective surfaces of the vehicle footwell produces a protective tray which will not be horizontally displaced under lateral forces created by the occupants' feet, or by the motion of the vehicle. Opposing pairs of the peripheral panels (e.g., the kick plate panel 55 opposite the inner side wall panel 45) "nest" or "cage" the liner, preventing its lateral movement. Thus, the outer side panel or kick plate panel 55, which closely conforms to a vehicle side wall at that position, has as its counterpart a portion of the inner side wall panel 45. Any tendency of the tray to shift leftward is stopped by the panel; any tendency of the tray to shift rightward is stopped by the panel portion. In a similar manner, the upstanding rearward and forward panels (40 and 50, respectively) cooperate to "cage" any forward or rearward motion of the tray within the vehicle footwell. The close conformance of the outer or lower surfaces of panels (35, 40, 45, 50, 55) to their respective mating surfaces of the vehicle footwell also increases the frictional force which will oppose any lateral movement. The close conformance provides a floor tray which will not undesirably shift position, and which will provide a steady and sure rest to the feet of the occupants. In some embodiments of the vehicle floor tray, the side panels (40, 45, 50, 55) will not be formed to abruptly extend from the bottom panel 35, but rather will be joined to the bottom or central panel 35 through transitions. These transitions may be sloped or curved and will have a varying degree of gradualness. In one embodiment, the transitions from bottom panel 35 to side wall panels (40, 45, 50, 55) have a radius of curvature between 0.1 and 0.5 inches. Additionally, the transitions may be linear or curved. In the embodiment shown in FIG. 1, there is a generally linear transition 46 between the bottom panel 35 and kick plate panel 55. In contrast, between the bottom panel 35 and the forward wall panel 50 is a curved transition 47. In the illustrated example, the central panel 35 is bounded by an outer perimeter that includes the curved transition 47 and the linear transition 46.

In the illustrated example of FIG. 1, the transitions between the bottom panel 35 and the forward wall panel are curved while the transitions between the bottom panel and the other side wall panels are generally linear. In the illustrated example, an upper edge 48 extends across the tops of the side wall panels (40, 45, 50, 55) and may be generally linear in portions (such as at the top of the kick plate panel 55) and may also be curved in portions (such as at the top of the forward wall panel 50.) Aside from apertures in the liner 11 for receiving anchorage devices (discussed below), the illustrated liner has a continuous construction (i.e., hole-free) below the upper edge 48 in order to contain fluid within vehicle floor covering system 10. In the illustrated example, at least 90% of the upper (or top) surface of the central panel 35 is planar or flat to facilitate the even spread of fluids over the top surface of the central panel 35. In another embodiment, at least 75% of the upper (or top) surface of the central panel 35 is planar.

As shown in FIGS. 2-6, another feature of the vehicle floor covering system 10 is a vehicle anchorage device 100 that has a relatively low profile. The total height of the vehicle anchorage device 100 excluding the tines is 0.25-0.50 inches in the illustrated example, and 0.315 inches in an exemplary embodiment. The vehicle anchorage device 100, or reusable anchor, is circular in shape in a preferred embodiment, but can also be square, rectangular, pentagonal, hexagonal, heptagonal, or octagonal in other embodiments. In the illustrated embodiment, the body has a margin with a series of sides that are disposed between and join the surfaces together to form a cylinder. The illustrated vehicle anchorage device 100 has a circular top 105 having a plurality of holes 110 adapted to receive features from a torsional device and a central aperture 115 adapted to receive a fastener from fabric insert. In the illustrated example, the circular top 105 has a diameter 120 between 1.0 and 1.4 inches, and in an exemplary embodiment a diameter of 1.317 inches. In the illustrated example, the central aperture 115 has a diameter 116 between 0.5 and 0.8 inches and an exemplary diameter of 0.665 inches, or approximately half the diameter of the circular top 105. The circular top 105 may include a protrusion 117 that extends into the central aperture 115. The plurality of holes 110 each have a diameter between 0.1 and 0.2 inches and in an exemplary embodiment a diameter of 0.165 inches. The circular top 105 extends down a height 125 between 0.07-0.10 inches, and 0.086 inches in an exemplary embodiment.

Figure 4:
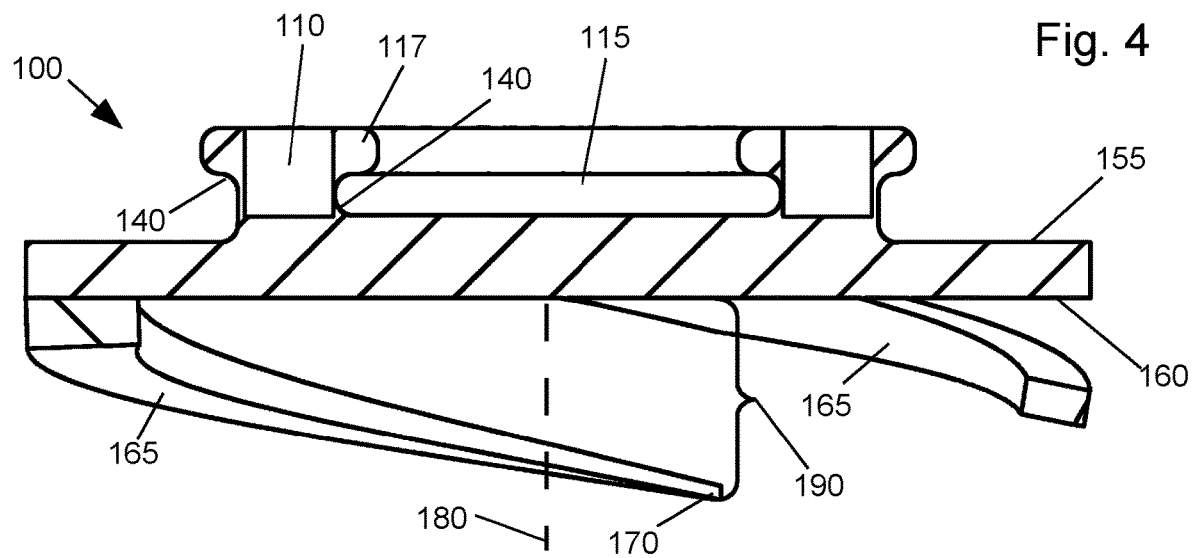
FIG. 4 is a schematic sectional view of a vehicle affixation device shown in FIG. 2.

The vehicle anchorage device 100 includes a middle portion 130 extending down from the circular top 105 that is concentrically aligned with the circular top 105. In some embodiments of the invention, the central aperture 115 of the circular top 105 extends past the circular top 105 and into the middle portion 130, and in other embodiments of the invention the central aperture 115 only extends through the circular top 105. For example, in one embodiment the middle portion 130 includes a magnet configured to attract metallic features that have been inserted into the central aperture 115 of the circular top 105. As shown in FIG. 4, the central aperture 115 may extend partially into the middle portion 130. In the illustrated example, the middle portion 130 has a minimum diameter of between about 1.1 and 1.3 inches, and 1.184 inches in an exemplary embodiment. In an exemplary embodiment of the invention, the diameter of the circular top 105 is between 1.05 and 1.5 times the diameter of the middle portion 130.

The middle portion 130 has a height 135 of about 0.1 to 0.2 inches, and 0.126 inches in an exemplary embodiment. In the illustrated example, the central aperture 115 has a depth between 0.15 and 0.175 inches, and 0.165 inches in an exemplary embodiment of the invention. In an exemplary embodiment of the invention, the height 135 of the middle portion 130 (i.e., the separation of the circular top 105 from the lower portion) is equal to the thickness of the liner 11.

In the illustrated embodiment, the circular top 105 and the middle portion 130 generally do not have sharp edges and instead the transitions are curved. In the illustrated example, the transitions 140 have a radius of curvature of 0.03 inches to 0.04 inches and 0.033 inches in an exemplary embodiment.

The vehicle anchorage device 100 has a lower portion 145 below the middle portion 130 with a diameter of between 1.8 and 2.0 inches in the illustrated example, and 1.965 inches in an exemplary embodiment. In an exemplary embodiment of the invention, the diameter of the lower portion 145 is between 1.25- and 2.5-times the diameter of the middle portion. In an exemplary embodiment of the invention, the diameter (or width) of the lower portion 145 is at least 25% larger than the diameter 120 of the circular top 105 or the middle portion 130.

The lower portion 145 has a height 150 between 0.09 and 0.12 inches, and 0.103 inches in an exemplary embodiment. In the illustrated example, the lower portion 145 has a circular flat upper surface 155 that is parallel to, and concentric with, the top surface of the circular top 105. The circular flat top 105 is adapted to be adjacent to a bottom surface of the liner 11.

The plurality of holes 110 for the thumb tool are evenly spaced about the circular flat top 105 and are located 0.9-1.1 inches away from each other on opposite sides of the central aperture 115 (or 0.45-0.55 inches to the center of the central aperture 115). In an exemplary embodiment of the invention, the holes are located 0.994 inches away from each other on opposite sides of the central aperture 115. In the illustrated example, four holes 110 are shown however more, or fewer holes 110 are contemplated to be used. It is generally expected that there will be at least two holes 110 on opposite sides of the central aperture 115, however a single hole could be used if the torsional device also engages with the central aperture 115. In an alternative embodiment of the invention, at the bottom of the central aperture 115 the lower portion 145 includes a structure, such as a Phillips screw head, adapted to receive a standard screwdriver. By using the screw head, the vehicle anchorage device 100 could easily be turned without using the plurality of holes 110. In the event that a user was to lose the specialized tool that secures into the plurality of holes 110, the vehicle anchorage device 100 could still be turned by using the structure on the lower portion 145.

The body of the anchorage device is preferably formed from stainless steel, which is durable and resilient. Other acceptable materials may include galvanized steel, aluminum, fiber reinforced plastic, or other sufficiently durable and resilient materials.

Protruding out of the flat bottom surface 160 of the lower portion 145 of the vehicle anchorage device 100 are at least three tines 165 that are also made out of stainless steel (or similarly sufficiently durable and resilient material), which is not easily permanently deformed. The free ends 170 of the tines 165 may be sharpened in order to aid their piercing of the carpeting pile.

In the illustrated embodiment of the invention, the free ends 170 of the tines 165 have a width 171 that is approximately one fifth the width 172 at the nearest contact point 173 of the base, and approximately one sixth the width 174 at the furthest contact point 176 of the base. The tines 165 have upper free surfaces 177 with a circular length 178 (as measured on its outer curved edge) of approximately 70% the circular length 179 (as measured on its outer curved edge) of the lower free surfaces of the tines 165. In another embodiment of the invention, the circular length of the upper free surface is between 50% and 90% of the circular length of the lower free surface. Additionally, the ends 170 may only be sharpened on the sides opposite the upper free surface. Preliminary tests indicate that sharpening the tines in this manner better entrains the tines onto a helical path as they are inserted into the carpeting pile. Alternatively, the ends 170 may be sharpened to a needle point.

The tines 165 are formed to be substantially disposed on helical paths that are at a substantial radius 175 from an axis 180 of the body. The axis is at an angle to the surface and matches the pitch (or centerline) of the tines. With vehicle carpeting, it has been found that the tines should proceed about respective helical paths for an angular distance 185 of approximately 130 degrees around the axis, and that the pitch 190 of the tine through this angle should be approximately 0.375 inches, with a downward angle of approximately 15-20 degrees, and 16.285 degrees in an exemplary embodiment. The pitch 190 must be chosen so that the textile layer to which the body is to be affixed will be completely or at least substantially penetrated, but that the tines will not progress much beyond the textile layer. The use of stainless steel to form the tines permits each of the tines to have a very small entrance profile as the free ends pierce the textile. This forms extremely small holes which, in the case of conventional carpeting, would not exist at all given the relatively loose weave of typical carpet backing. Hence, the affixation of the body to piled carpeting will cause almost no perceptible damage to the carpeting itself.

To maximize resistance against pullout, the tines are substantially disposed on helical paths at a substantial radius 175 from the axis 180. In the illustrated embodiment, radius 175 is about one inch. The radius should be chosen as to not be so large that the entire body becomes unduly large, but yet not so small as to no longer be sufficiently resistant to pullout forces. As the radius increases, the exposed length of the tines becomes larger, and therefore their ability to grip the carpeting pile and underlying fabric layer is increased. Based on the characteristics of the fabric used in the OEM footwell (e.g., carpeting pile height and carpet density), the radius of the helical paths may be increased or decreased to optimize resistance to pullout forces and ease of tine insertion.

In a preferred embodiment, the tines are rectangular in shape, but can also be circular, octagonal, spiral, hexagonal, triangular, pentagonal, heptagonal, octagonal, or barbed. The width 174 of the larger end of the tine is within 0.225 inches and the width 171 of the smaller end of the tine is within 0.04 inches for a width ratio of approximately 5.5:1. In other embodiments of the invention, the width ratio of the tines is between 4.0:1 and 7.0:1. The radius of the tine 165 is about 0.9825 inches in the illustrated example, and in other embodiments of the invention is between 0.5 inches and 1.5 inches. The thickness of the tine at its larger end varies and the thickness of the tine at its smaller end is within 0.025 inches. The overall length of the tine 165 is within about 2 inches as measured along the outer edge of the tine. The tines are angled downwardly in respect to the bottom surface of the anchor within 16.285 degrees.

Figure 7:
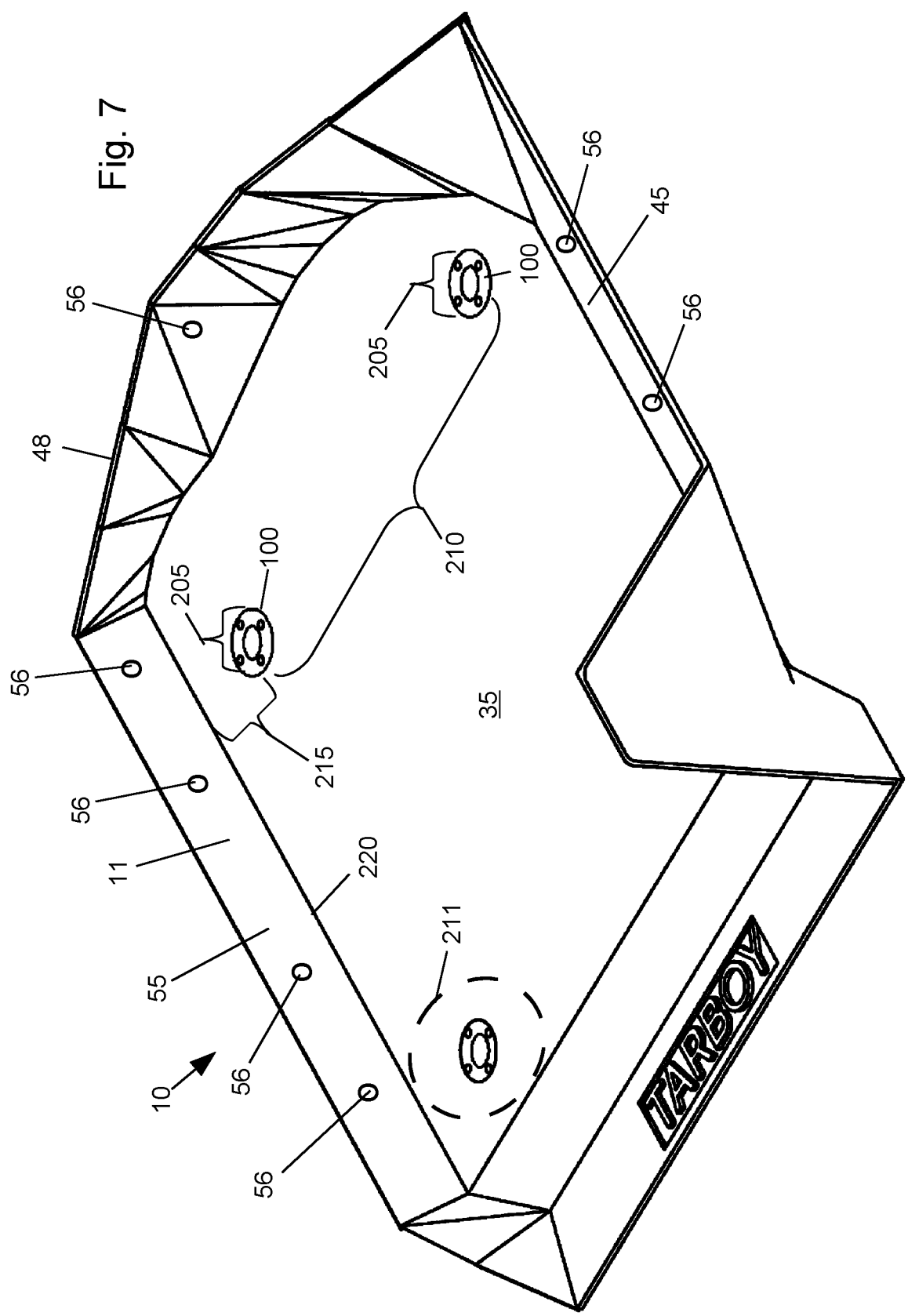
FIG. 7 is an isometric view of the vehicle affixation devices installed into the vehicle floor tray.
Figure 8:
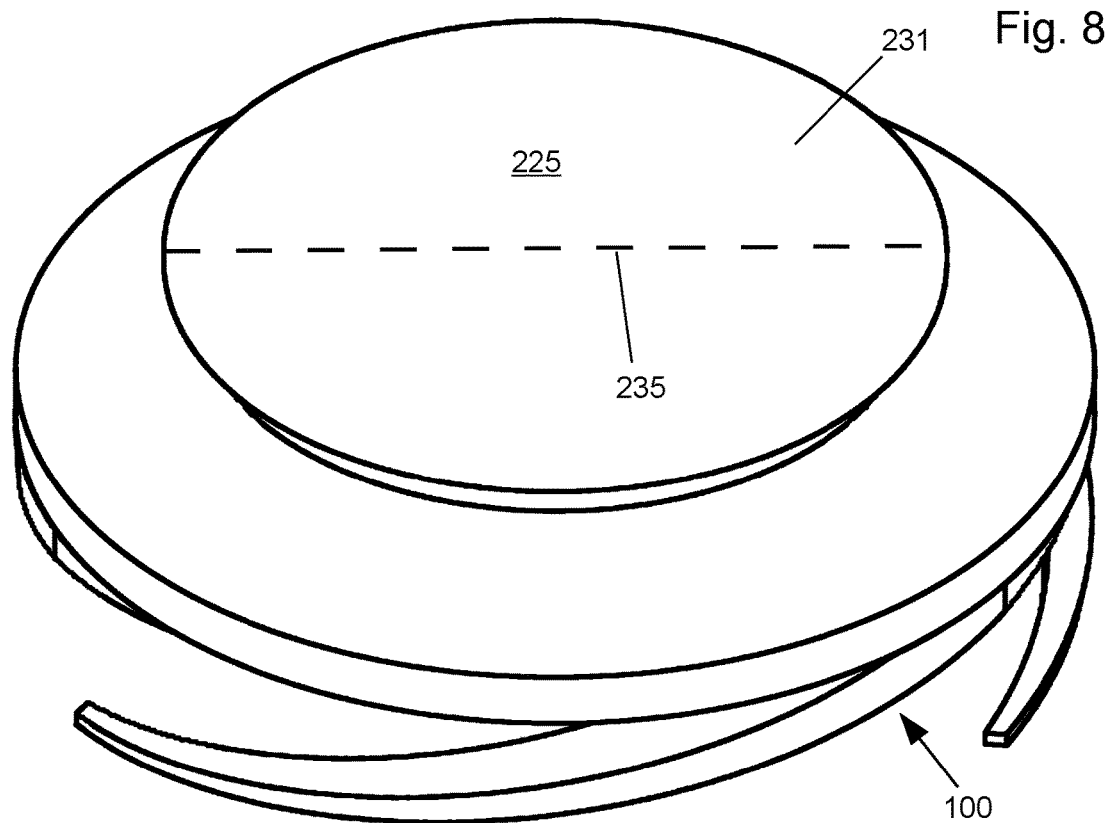
FIG. 8 is an isometric view of the carpet clip attached to the vehicle affixation device.
Figure 9:
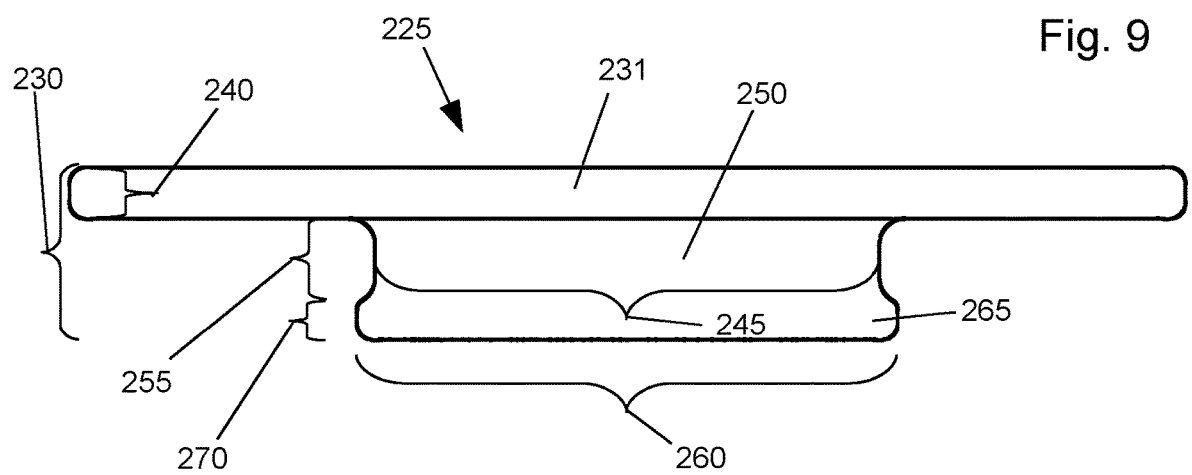
FIG. 9 is an elevational view of the carpet clip.
Figure 10:
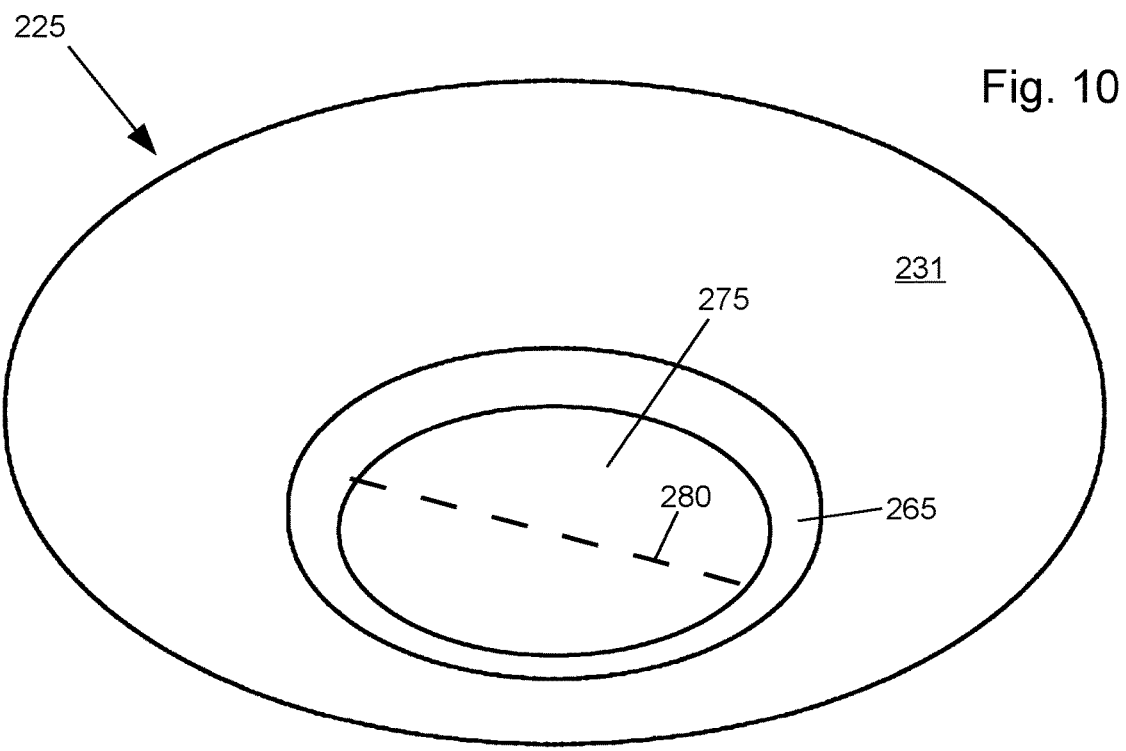
FIG. 10 is an isometric view of the carpet clip shown in FIG. 9.
Figure 11:
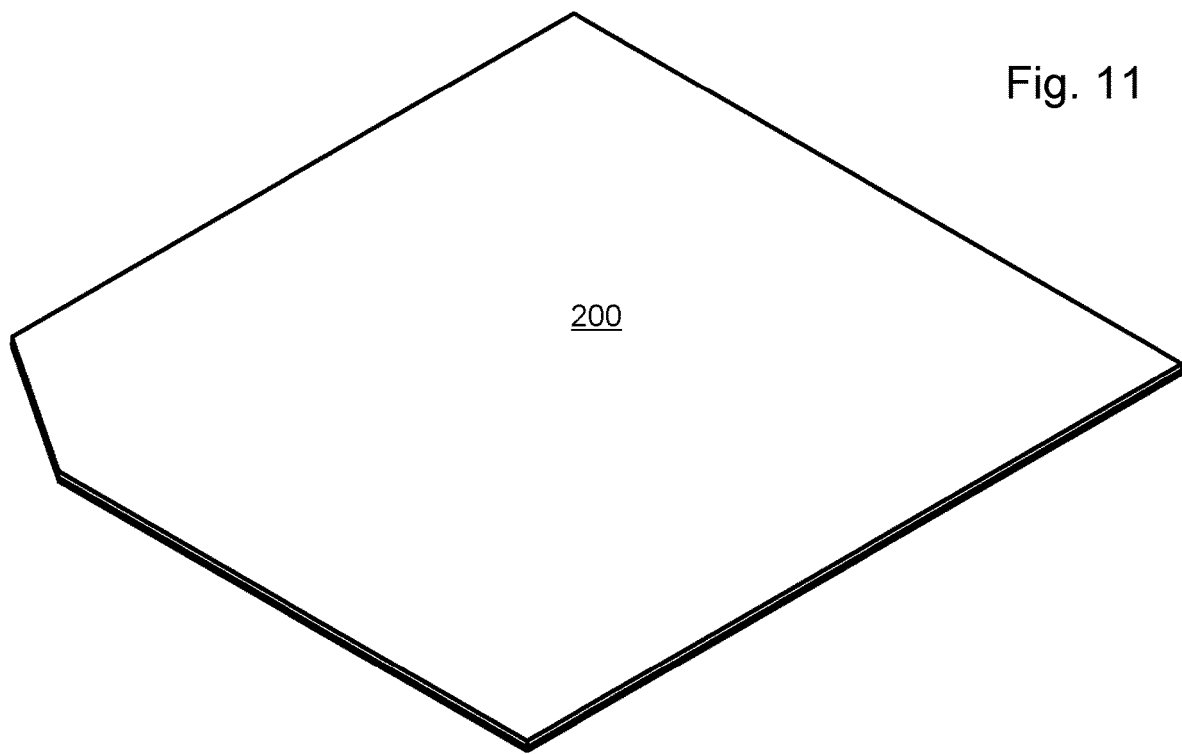
FIG. 11 is an isometric view of the removable carpet insert.

FIG. 7 illustrates an example of a vehicle floor covering system 10 without a fabric insert (item 200 shown in FIG. 1). Without the fabric insert, the vehicle anchorage devices 100 in the liner 11 can be seen. The diameters 205 of the holes in the liner in which the anchorage devices 100 are secured are between thirty and one hundred percent of the outside diameter of the outer diameter of the reusable anchor flange and is generally sized to be approximately equal to the diameter 120. The vehicle anchorage devices 100 have a spaced apart distance 210 (as measured from the axes 180 of the anchorage devices) from the nearest other vehicle anchorage devices 100 that is generally not less than 6 inches apart and/or greater than 14 inches apart. Furthermore, the vehicle anchorage devices 100 and their necessary holes in the vehicle liner are all located in relation to the removable insert and are, therefore, generally positioned at a distance 215 within 4 inches of the outer perimeter 220 of the central panel of the liner 11. In one embodiment of the invention, an area 211 within 1 inch of hole on the liner 11 is flat with the upper and lower surfaces of the liner 11 being undistorted fully planar. The term "undistorted fully planar" is herein defined to mean that the specified liner upper or lower surface is entirely planar (e.g., flat) when not acted upon (e.g., compressed or distorted) by another feature of the vehicle floor covering system 10. In another embodiment of the invention, the upper surface of the liner is undistorted fully planar within 2 inches of the holes. In yet another embodiment, the upper/top surface of the liner is undistorted fully planar within three inches of the holes or openings. In yet another embodiment, the entire top surface of the central panel 35 of the liner is undistorted fully planar.

The lower surface of the liner may have a surface that is larger than the corresponding floor surface of the OEM footwell. For example, the lower surface of the liner may be between 100% and 107% the size of the OEM floor surface. The size differences contributes to the inherent tightness of the liner to the OEM surface. In some embodiments, the upper surface of the liner is generally smooth with no grooves, furrows, channels, ruts, valleys, vallecula or pathways. A smooth liner provides a structure that is easily cleaned. A micro profile of the upper surface of the liner will be without any arca raised, imprinted, embossed, brocaded, or impressed textures into the liner. In one embodiment, the liner has an upper surface that has a reflectance of 20 to 60 gloss units (GU) on all of the top surface of the liner. Nowhere throughout the entire top surface of the liner will there be no radii less than ⅛th inch as the contour of the liner changes from one planner surface to another.

In FIG. 7, three anchorage devices 100 are visible in the central panel 35 of the liner 11. Other versions of the anchorage devices, peripheral anchors 56 (typically smaller than those used in the central panel 35) may be secured to the side wall panels, such as the kick plate panel 55 opposite the inner side wall panel 45 to help prevent the side walls from collapsing down onto the central panel 35 when the liner 11 is installed in the OEM foot well. In one embodiment, at least 80% of the peripheral anchors 56 are within 30% of the upper edge 48 of the liner on the side wall panels (40, 45, 50, 55) as measured towards the center point of the liner. As an example, if the side wall panel 55 extends 5 inches from the outer perimeter 220 to the upper edge 48, at least 80% of the peripheral anchors 56 are within 1.5 inches (30% of 5 inches) of the upper edge 48. In another embodiment, at least 90% of the peripheral anchors 56 are located within 40% of the upper edge 48 of the liner on the side wall panels (40, 45, 50, 55) as measured towards the center point of the liner.

Figure 12:
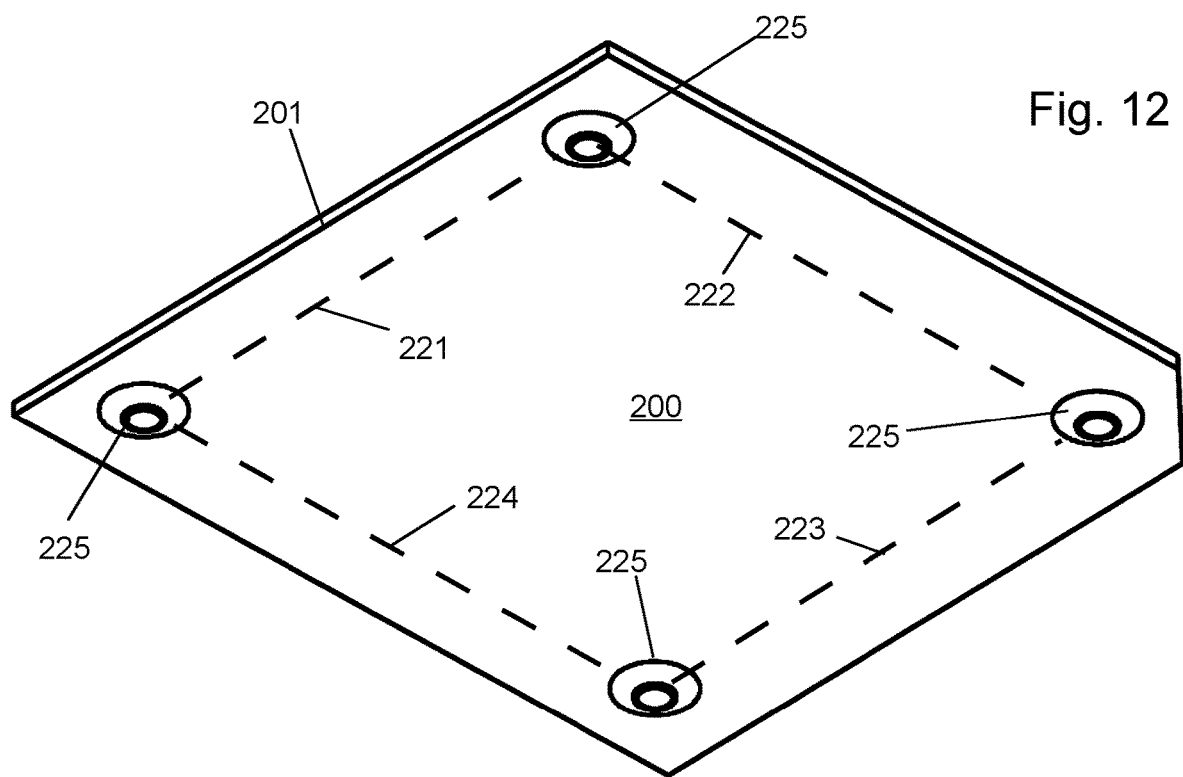
FIG. 12 is an isometric view of the removable carpet insert shown in FIG. 11, illustrating a reverse or second surface thereof.

The main anchorage devices 100 serve a number of purposes including holding the fabric insert 200 (or absorption layer) in close proximity to the OEM surface of the vehicle, holding the liner adjacent to the OEM surface of the vehicle, and aligning the components. The main anchorage devices 100 facilitate the removability and reinstallation of absorption layer (fabric insert) and liner. When viewed in relation to the fabric insert 200, in one embodiment, at least 80% of the anchorage devise 100 will be located within 30% of the peripheral edge of the fabric insert 200 as measured from the peripheral edge 201 of the fabric insert (see FIG. 12) towards the center of the fabric insert 200. As an example, in a 10-inch by 10-inch square fabric insert, at least 80% of the anchorage devices would be within 1.5 inches (10÷2×30%) of the peripheral edge 201. In another embodiment, at least 90% of the anchorage devices 100 are located within 40% of the peripheral edge of the fabric insert 200 as measured from the peripheral edge 201 of the fabric insert (see FIG. 12) towards the center of the fabric insert 200.

Typically, the floor of the vehicle is affixed to a heavy-duty carpeting that is relatively wear-resistant and impervious to various kinds of chemical attack. The carpeting includes a backing or base textile layer and a pile formed of a mass of upstanding fibers. The floor portion may have a relatively flat portion and a relatively sloped portion. In the use of the invention, where it is desired to releasably but firmly affix either a rubber or a carpeted mat to the floor portion, at least one and possibly several affixation devices are affixed to the carpeting. This is done by simply screwing the vehicle anchorage device that is already placed in the pre-determined hole locations on the liner into the carpeting device; as the device is pushed toward the carpeting, the vehicle anchorage device is rotated clockwise by use of a thumb tool. At the end of this process, the affixation device has its tines inserted into the carpeting, and in particular these tines have pierced the base layer at three diametrically opposed locations. The upstanding carpet pile layer may be somewhat depressed underneath the body, and this is even desirable because the device will then not be apparent after the mat is placed. Once the device is affixed to the carpeting, the fastening material is face up already installed into the vehicle floor liner. If it ever becomes desirable to remove the affixation devices, this can simply be done by unscrewing them from the carpeting. The damage to the carpeting will be virtually imperceptible because of the relatively small diameter of the tines. Through the action of the tines, a relatively large amount of the carpeting has been engaged, and it will be difficult to pull out any affixation device without also rotating the device in the opposite direction of affixing the device. The inadvertent removal of the devices, as by jerking out a mat to which the devices are releasably attached, would be very difficult.

As shown in FIGS. 8-12, in some embodiments of the invention, there is a removable, absorbent, machine washable fabric insert 200 (or absorption layer) with a plurality of clips 225 on the underside of the fabric insert 200 that are configured to engage with the vehicle anchorage devices 100 installed in the liner to inhibit separation and/or lateral movement between the liner insert and the vehicle floor liner. The clips 225 are separated by distances (221, 222, 223, and 224) that are equal to and aligned with the separation of holes in the liner.

The removable fabric insert 200 can be made from microfiber, carpet, or other non-woven materials and may have a waterproof lining on its underside. The size of the removable insert is not more that 99 percent of the size of vehicle floor liner 11 and has a multitude of pre-welded circular clips 225 within 4 inches of its circumferential edge. The plastic clips 225 are designed to align and "click" into the anchorage devices installed in the vehicle floor liner. The overall height 230 of the clip 225 is generally within 0.22 inches, the diameter 235 of the top portion 231 within 1.5 inches, and the height 240 is within 0.07 inches. The outside diameter 245 of the middle portion 250 is within 0.645 inches and the height 255 is within 0.1 inches. The outside diameter 260 of the lower portion 265 is within 0.69 inches and the height 270 is within 0.05 inches. The clip's centered inner hole 275 has a diameter 280 within 0.56 inches and a depth within 0.15 inches. All edges of the top portion 231 are radiused within 0.02 inches. The edges of the middle 250 portion are radiused within 0.033 inches. The top edge of the bottom portion 265 is radiused within 0.013 inches and the bottom edge of the bottom portion is radiused within 0.02 inches.

Multiple types of fabric inserts/absorbent layers may be required for various uses in different vehicles. Flexibility, size, thickness, and densities may require a multitude of different retainer clips. The quality and location of these clips may be calculated at the time of purchase based on the type of vehicle, OEM media and, fabric insert/absorbent layer chosen by the consumer. In one embodiment of the invention, the fabric insert/absorbent layer are sold separately from the liner and anchorage devices to allow consumers to customize their floor covering system. For example, absorbent layers may be designed for specific types of conditions such as a thin absorbent layer for arid locations with low precipitation and high evaporation rates, and a thick absorbent layer for wet humid locations with high precipitation and low evaporation rates. It is generally expected that the fabric insert/absorbent layer will fit within the central panel 35 of the liner, however in some instances the absorbent layer will extend at least partially up the sidewalls. As an example, in order to increase the rate of fluid evaporation from the fabric insert, the surface area of the fabric insert may be increased by having it extend at least partially up the sidewalls of the liner. In one embodiment of the invention, if the fabric insert extends up the sidewalls, the peripheral anchors 56 connect to and secure the upwardly extending portions of the fabric insert.

The removable insert 200 of the present invention adds flexibility and choice to the existing floor mat. The benefit of the removable insert is to protect footwear and clothing during inclement weather, while the user is given the option, through quick and easy exchange, of dressing up the mat with a more aesthetically appealing and comfortably supportive insert during other times of the year.

Figure 13:
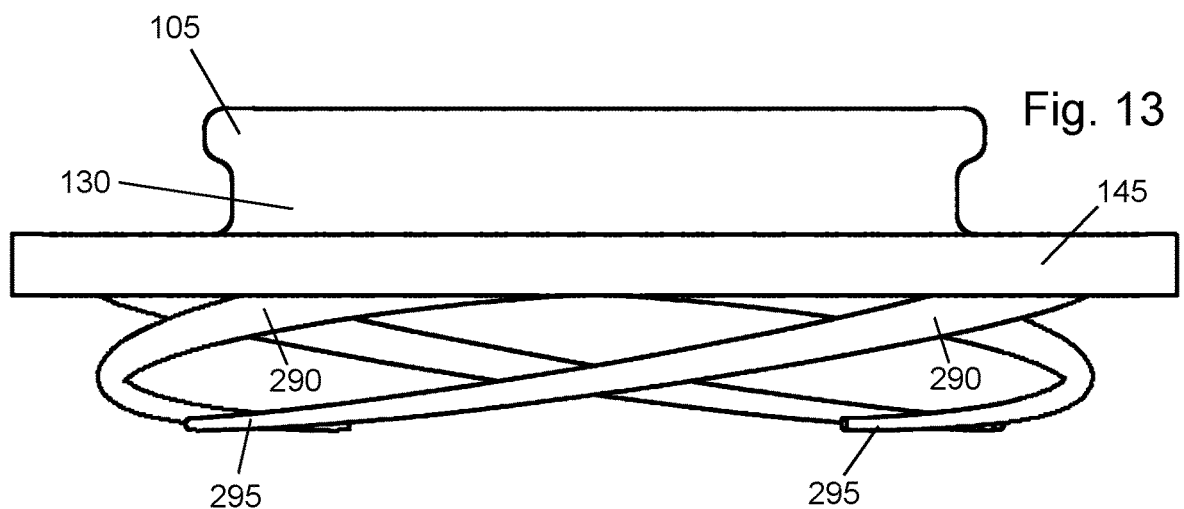
FIG. 13 is an elevational view of an alternate embodiment of the invention.
Figure 14:
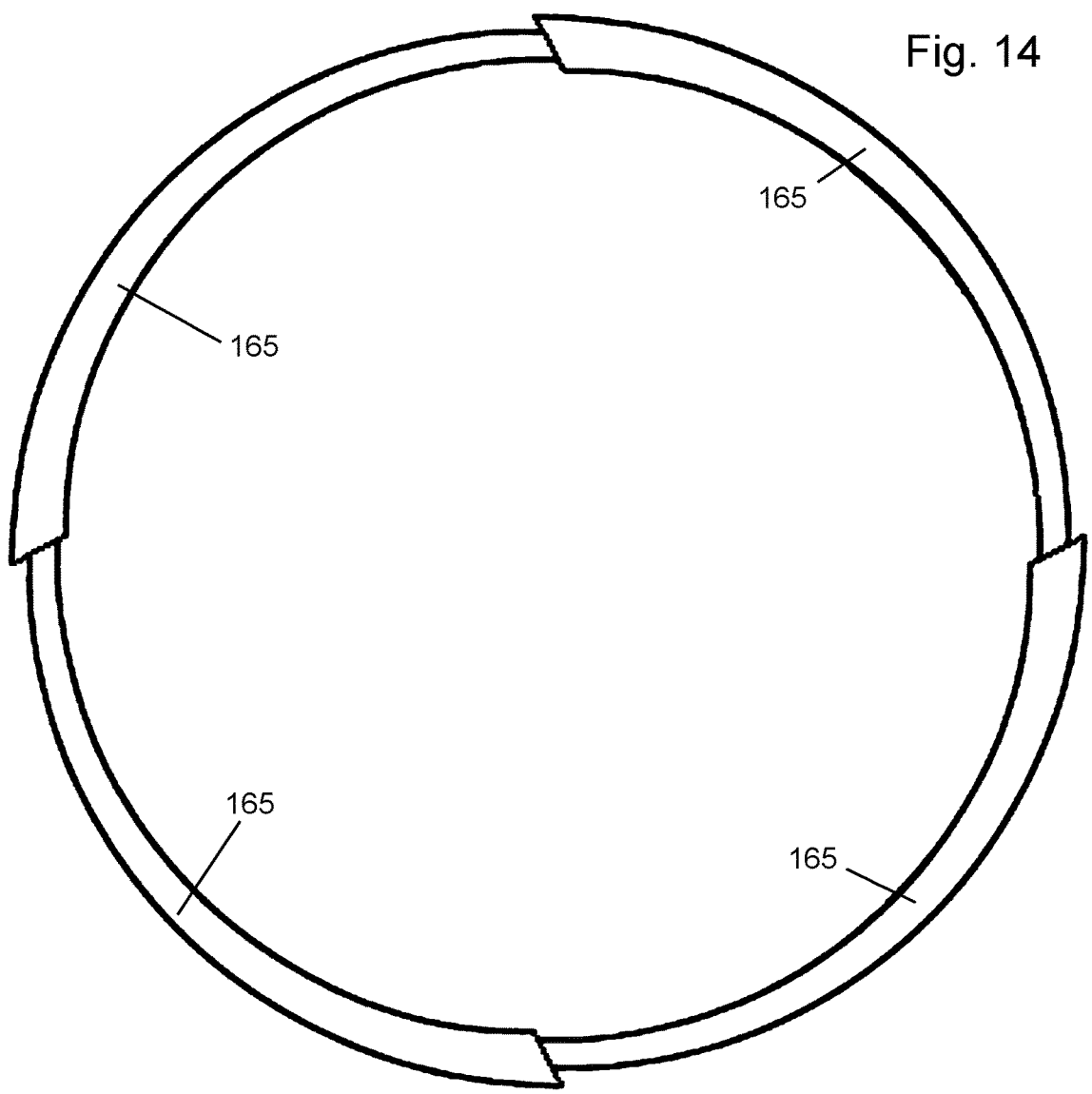
FIG. 14 is a plan view of tine members formed according to an alternate embodiment of the invention.
Figure 15:
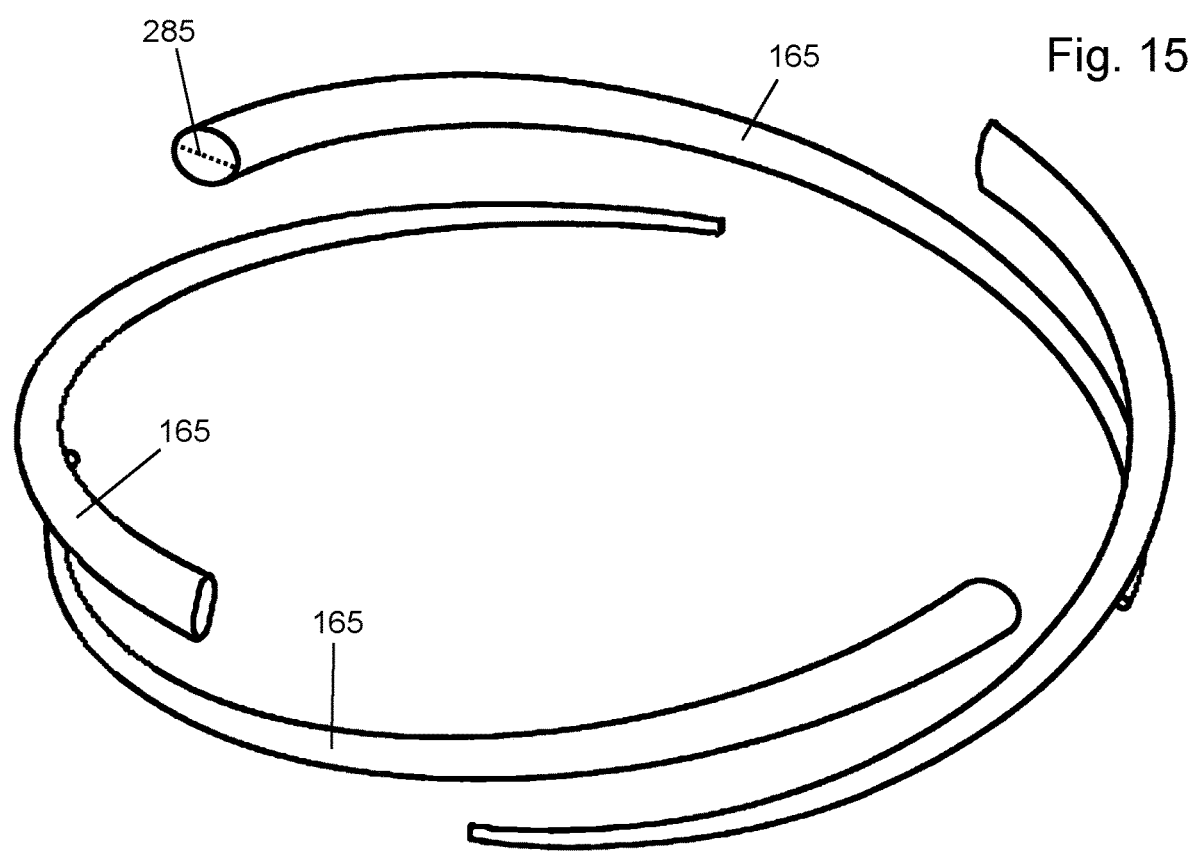
FIG. 15 is an isometric view of an alternate embodiment tine members shown in FIG. 13.

FIGS. 13-15 illustrate an alternative embodiment of the invention with a vehicle anchorage device similar to the one disclosed in FIGS. 2-5 with the circular top, middle portion, and lower portion (105, 130, and 145 in FIG. 3) being substantially identical in the two different embodiments. The tines 165 of the embodiment shown in FIGS. 13-15 have generally circular cross sections 285 that taper down as the tines extend further away from the lower portion of the vehicle anchorage device. Similar to the device shown in FIGS. 2-5, the tines 165 in FIGS. 13-15 overlap to a degree so that one portion 290 of a first tine is directly between a portion 295 of a second tine and the lower portion 145 of the vehicle anchorage device. In the device shown in FIGS. 13-15, there are four evenly spaced tines that extend downward from the lower portion 145. In an alternative embodiment, a greater or fewer number of tines could be utilized. In one embodiment of the invention 3 tines are used and in another embodiment of the invention 6 tines are used in the vehicle anchorage device.

Figure 16:
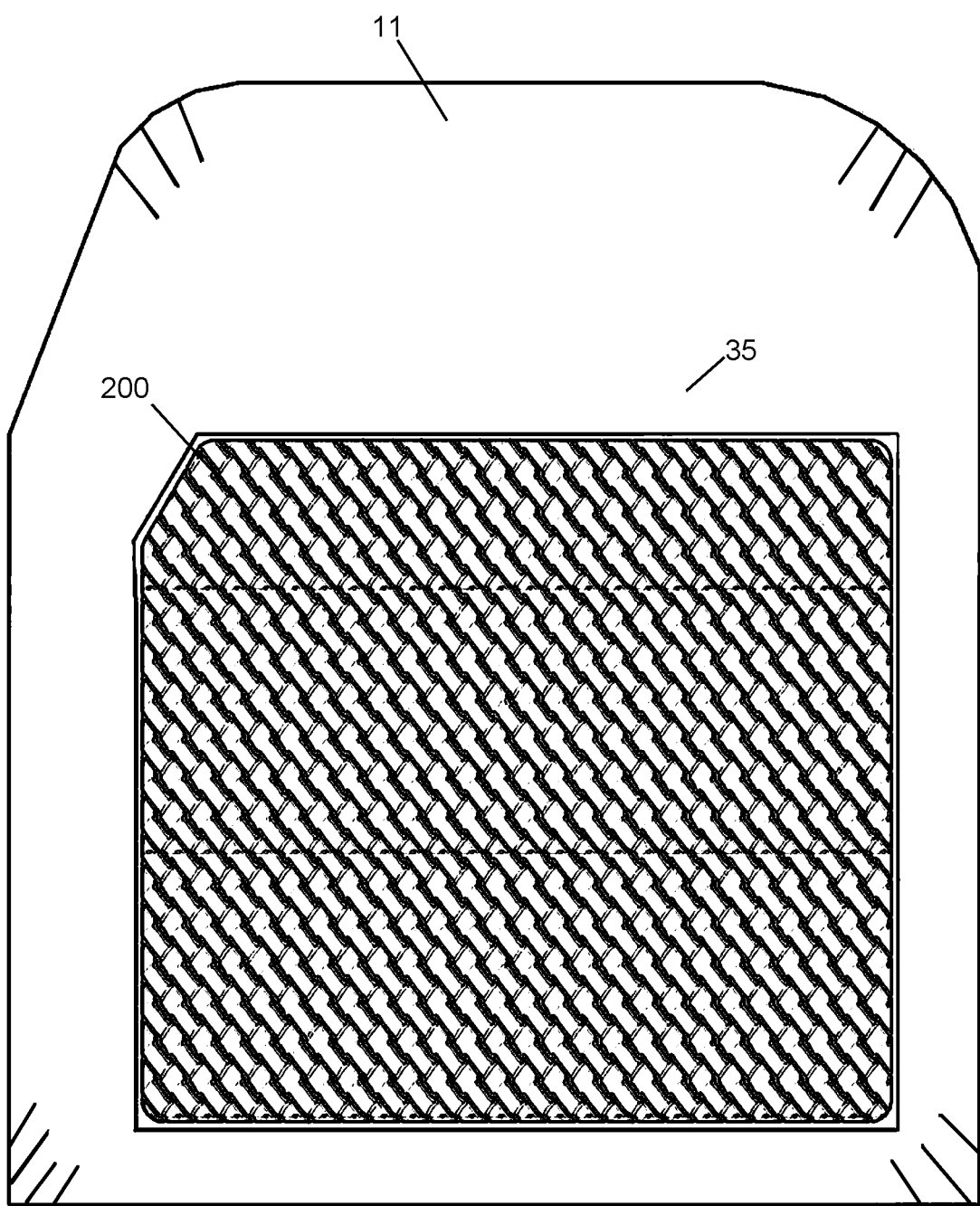
FIG. 16 is a plan view of a floor mat system with a fabric insert secured to a liner.
Figure 17:
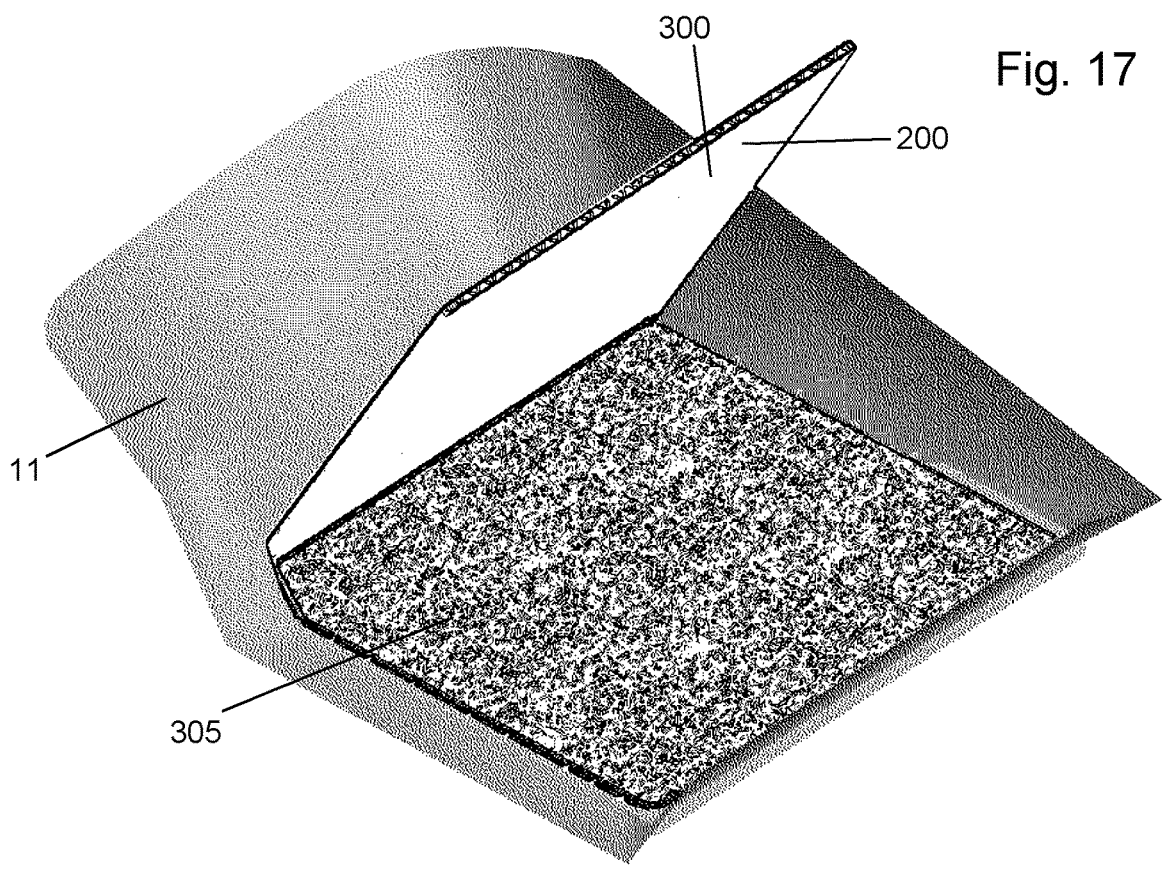
FIG. 17 is a perspective view of a floor mat system with a fabric insert being removed or secured to a liner.
Figure 18:
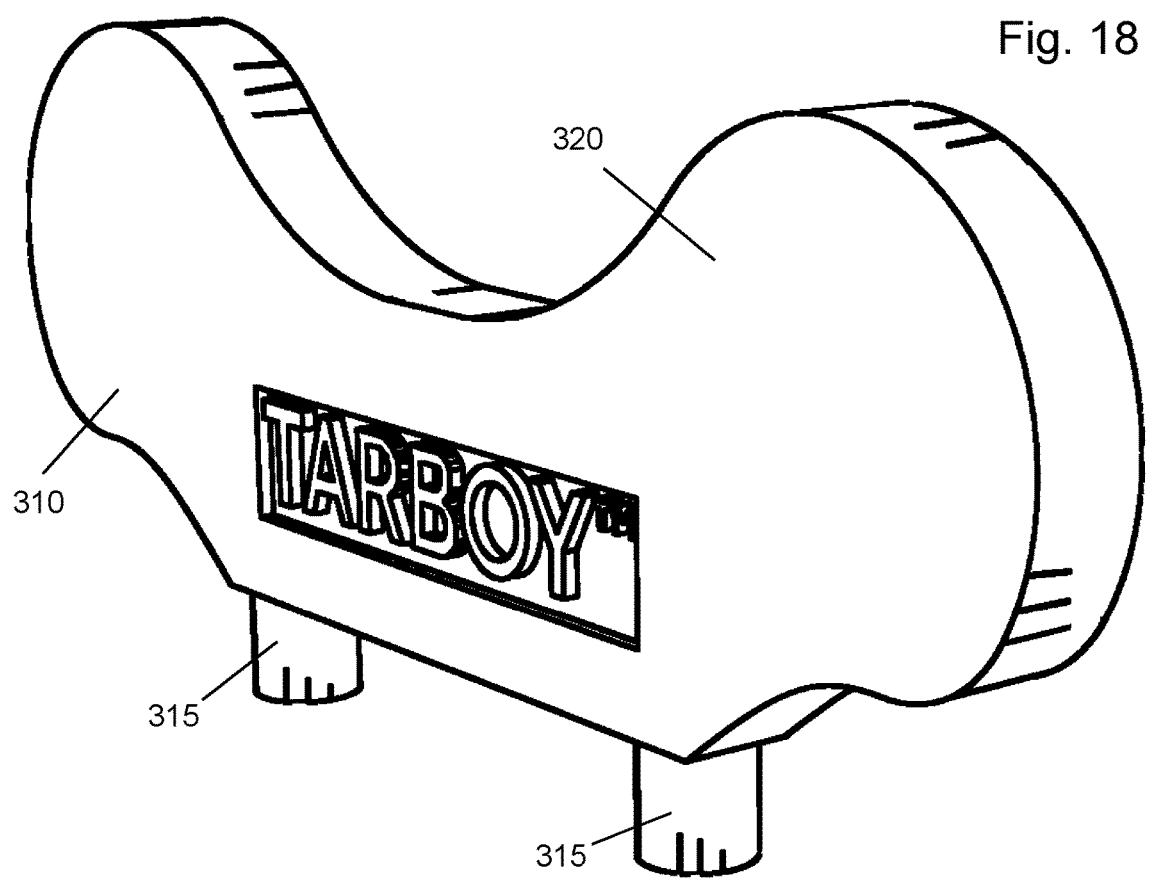
FIG. 18 is a perspective view of a hand tool for rotating an anchoring device.
Figure 19:
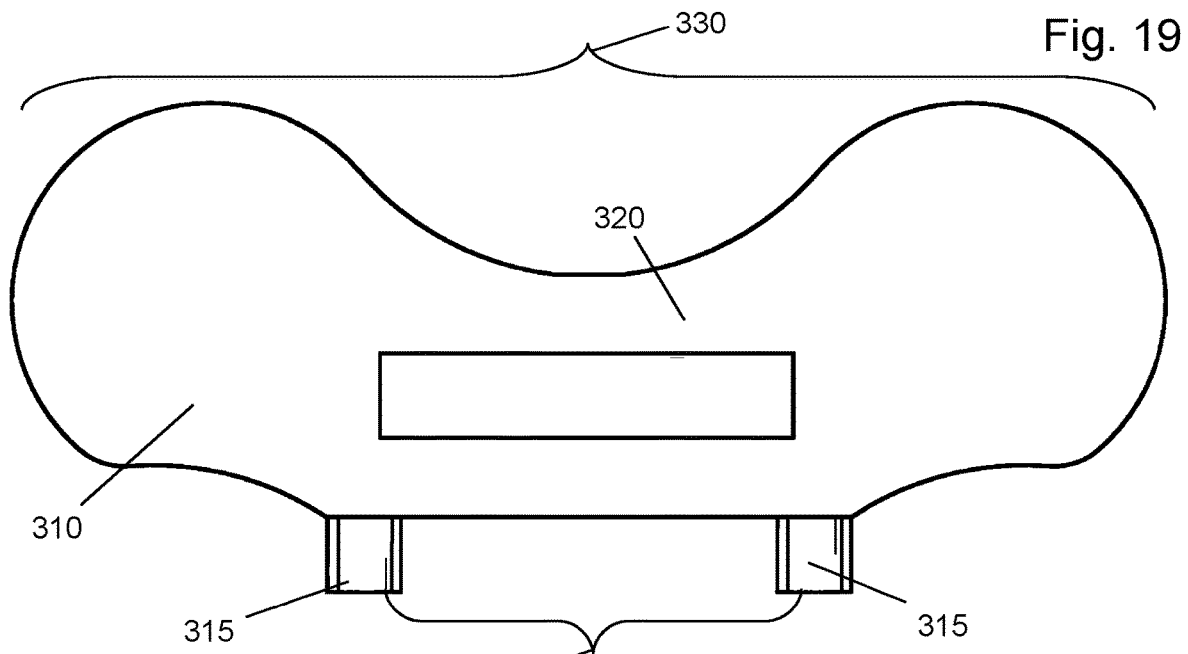
FIG. 19 is an elevational view of a hand tool for rotating an anchoring device.

FIGS. 16 and 17 illustrate an example of a floor covering system with a liner 11 and a fabric insert 200 secured to the central panel 35 of the floor covering system. In contrast to the sharply defined corners and edges of the system shown in FIG. 1, the system shown in FIGS. 16 and 17 has smooth transitions from the central panel 35 to the side walls. As shown in FIG. 17, a multi-part fabric insert can be utilized with a wear layer 300 and a lower wicking layer 305. In one embodiment of the invention, the upper wear layer 300 is specifically constructed to withstand abrasion from users' shoes scraping against the wear layer while the lower wicking layer 305 is to provide better wicking of fluid across the liner. In an exemplary embodiment of the invention, the liner 11 is watertight and does not drain fluid to the OEM footwell. While the floor covering system can be removed from the footwell in order to drain fluid, it is expected that most fluid will be removed from the floor covering system via evaporation. The wicking layer 305 is configured to spread fluid in the floor system across a wide area in order to maximize the surface area of the fluid and increase its rate of evaporation. Additionally, the wear layer 300 may be constructed to allow airflow to pass through it in order to speed evaporation from the wicking layer 305.

FIGS. 18-22 illustrate tools for rotating the vehicle anchorage devices previously described. The thumb tool 310 shown in FIGS. 18 and 19 includes first and second protrusions 315 extending down from a generally flat body 320. The first and second protrusions 315 are spaced apart from each other by a distance 325 that is greater than the diameter 116 of the central aperture 115, but less than the diameter 120 of the circular top 105. The first and second protrusions 315 are dimensioned to be slightly smaller than the holes 110 of the vehicle anchorage device in order to allow for easy insertion. The protrusions are placed into the holes 110 and the flat body 320 acts as an area for a user to grip to turn the vehicle anchorage device. In the illustrated example, the flat body 320 has a length 330 that is between two and three times the distance 325 between the first and second protrusions 315. The length 330 of the flat body provides a user with leverage to rotate the protrusions 315 and the vehicle anchorage device. Depending on the characteristics of the vehicle anchorage device and the OEM footwell (e.g., carpet pile thickness, etc.) a varying amount of torque will be required to secure the vehicle anchorage device into the OEM footwell.

Figure 20:
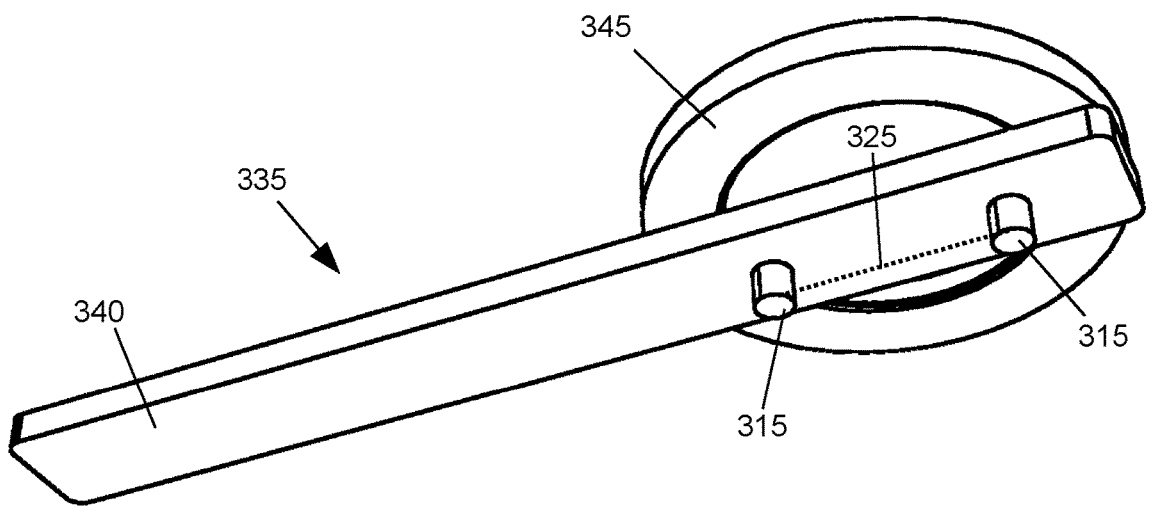
FIG. 20 is a perspective view of a second embodiment of a hand tool for rotating an anchoring device.
Figure 21:
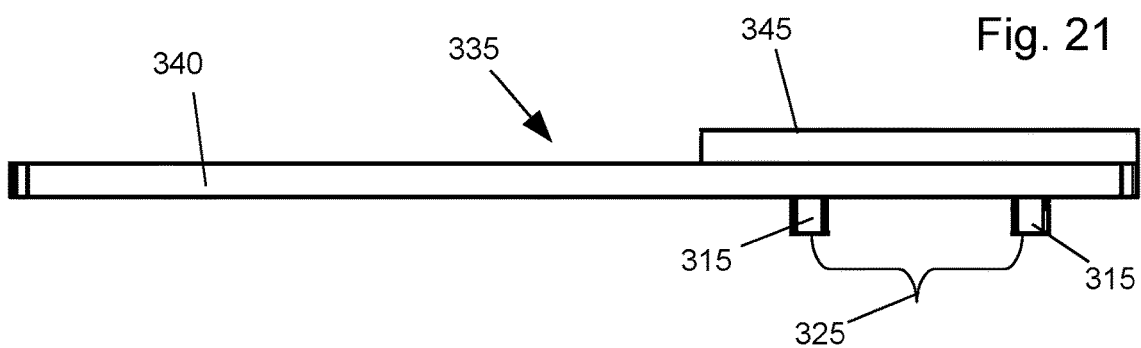
FIG. 21 is an elevational view of the hand tool shown in FIG. 20.

The hand tool 335 shown in FIGS. 20-22 has first and second protrusions 315 spaced apart by the distance 325 and adapted to be secured in the holes 110 of a vehicle anchorage device. The hand tool 335 also includes an arm 340 that extends away from the protrusions. In the illustrated example, the length of the arm 340 is shown as being generally parallel to, or in line with the first and second protrusions 315, but in other embodiments of the invention the arm will be oriented at other angles relative to the protrusions. The length of the arm 340 provides greater leverage for a user inserting the vehicle anchorage device into the carpeting of an OEM footwell.

Figure 5:
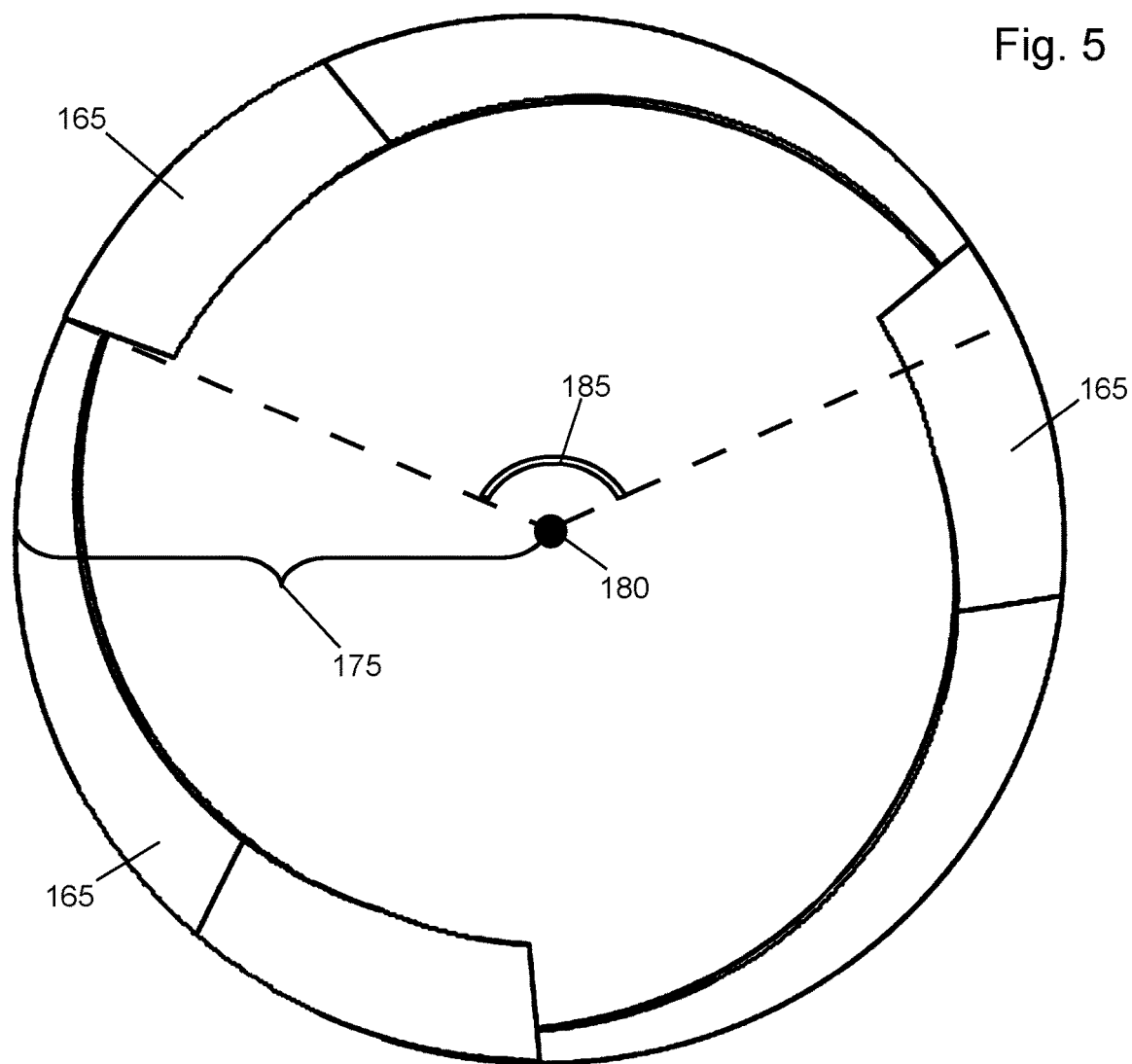
FIG. 5 is a plan view of tine members formed according to a preferred embodiment of the invention.
Figure 6:
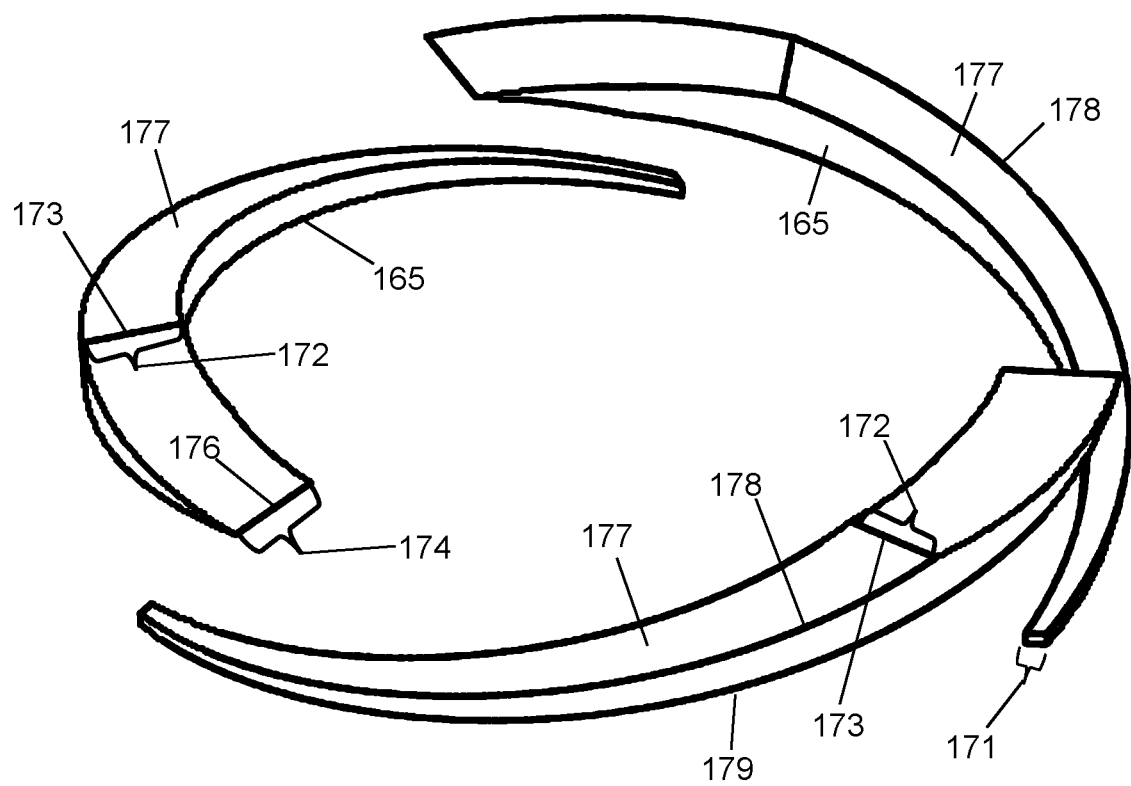
FIG. 6 is an isometric view of the tine members shown in FIG. 5.

The tools shown in FIGS. 18-22 are shown as being distinct from the vehicle anchorage devices, however in other embodiments of the invention the tools for rotating the vehicle anchorage device may be integrally formed into the device itself. In one embodiment of the invention, a circular top of the vehicle anchorage device includes a hinged latch that can rotate upward to provide a user an area to grasp in order to rotate the device. The latch may have a structure with a shape and curvature similar to half the circular ring 345 with two ends of the structure hinged to the circular top. Once the attachment device is rotated, the internally formed latch may be rotated down to provide a flat surface for the circular top. A similar structure is shown in FIGS. 5 through 6*b*, and the accompanying text, of U.S. Pat. No. 6,460,902 entitled "Slam latch and hatch assembly including a slam latch," the contents of which are herein incorporated by reference.

FIGS. 23 and 24 illustrate a miniature vehicle anchorage device 350. Unlike the full-sized anchorage device shown in FIGS. 2-5, the miniature vehicle anchorage device 350 does not have a central aperture 115 adapted to receive a portion of a clip. Like the full-sized anchorage device, the miniature vehicle anchorage device 350 includes a plurality of holes 110 adapted to receive features from a torsional device. The circular top 105, middle portion 130, and lower portion 145 form a circular pocket for receiving and securing the liner. While the illustrated miniature vehicle anchorage device 350 does not include a central aperture, it does have two central attachment points 355 adapted to receive a miniature clip to secure a fabric insert to the miniature vehicle anchorage device 350. In the illustrated example, the central attachment points 355 are shown as circles; however, other shapes and structures may be used instead for the central attachment points. In one embodiment of the invention, the central attachment points are square in shape and contain magnets adapted to secure ferrous structures embedded in the fabric insert. In another embodiment of the invention, the miniature vehicle anchorage device 350 do not include any structures for securing a fabric insert to the anchorage device. In one embodiment of the invention, a first plurality of full-sized anchorage devices shown in FIGS. 2-5 is used to secure the central panel 35 of the liner to the OEM footwell while a second plurality of miniature anchorage devices (shown in FIGS. 23-24) is used to secure the side wall panels (40, 45, 50, 55) to the OEM footwell.

FIG. 25 illustrates an example of a tine 165 adapted for use with the miniature anchorage device. The tine 165 has a thickness 360 at its attachment point of approximately $\frac{1}{10}^{th}$ of an inch with a lateral distance 365 between the attachment point 361 and the free end 170 of the tine 165 being approximately $\frac{7}{10}^{ths}$ of an inch. The longitudinal distance 370 from the attachment point to the free end 170 is approximately $\frac{4}{10}^{ths}$ of an inch. The tine 165 has an outer radius 375 of approximately half an inch and an inner radius of $\frac{7}{16}^{ths}$ of an inch at the locations shown in the images. The tine 165 has a thickness of approximately $\frac{1}{20}^{th}$ of an inch near the attachment point 361.

FIGS. 26-31 show various clips 225 adapted to be received by a vehicle anchorage device. The clip 225 shown in FIGS. 26-29 includes a top 380, a middle section 385 and a lower section 390 that form a circular pocket 395 similar to the pocket formed by the vehicle anchorage device shown in FIGS. 3 and 4. The lower section 390 is configured to rest up the circular top of the vehicle anchorage device. In the illustrated example, the pocket 395 is dimensioned to receive and secure the wicking fabric insert. Extending down from the lower section 390 is a fastener section 400 adapted to be received in the central aperture of the vehicle anchorage device. The fastener section 400 is structured such that it can be pushed into (or pulled out of) the central aperture without specialized tools such that the fabric insert can be easily removed for cleaning. In the illustrated example, the fastener section 400 includes a slight outward facing flange 405 that acts to secure the clip 225 in the central aperture of the vehicle anchorage device. The fastener section 400 may also include a hollow portion 410 to allow for easier inward deflection of the slight outward facing flange. In addition to the fastener section, other structures may be used to connect the clip to the vehicle anchorage device. For example, in one embodiment an adhesive glue is utilized to connect the two structures. Alternatively, magnets may be included in the clip, the vehicle anchorage device, or both such that magnetic forces secure the two structures together. Alternatively, the clip and anchorage devices may be secured together via friction fit, compression, or tortional forces on the two structures. The shapes of the clips and anchorage devices may be changed to accommodate the way that they are connected. For example, if an adhesive were to be used to connect the absorption layer to the anchorage device, the clip on the absorption layer may be a thin sheet of plastic that presents a large adhesive covered area to the anchorage device when installed.

Figure 28:
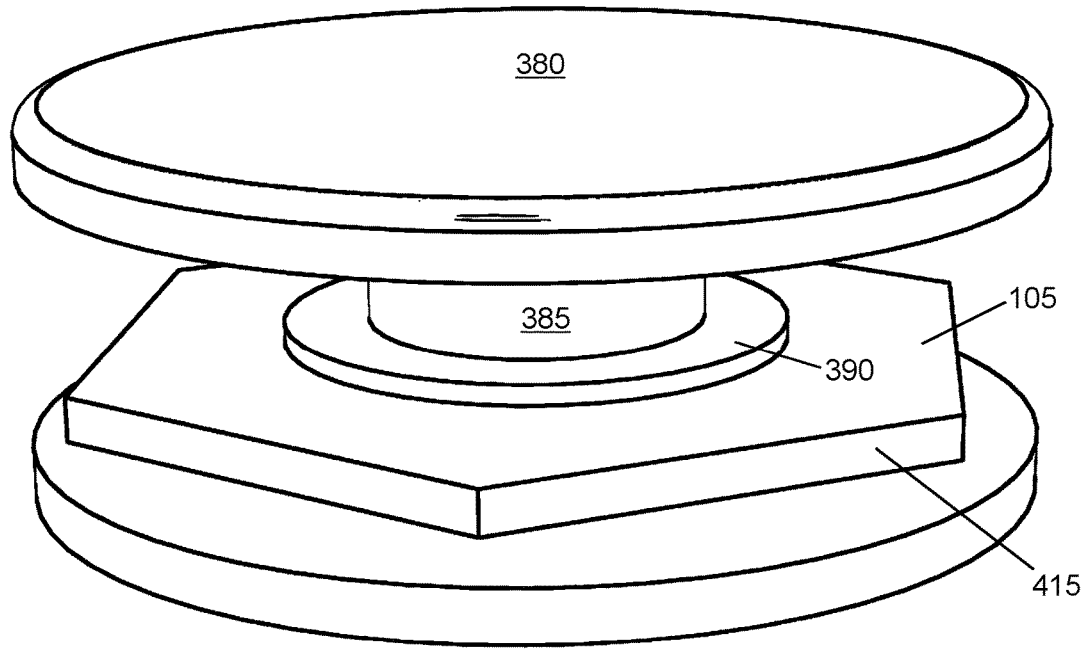
FIG. 28 is a perspective view an anchoring device secured to a clip.
Figure 29:
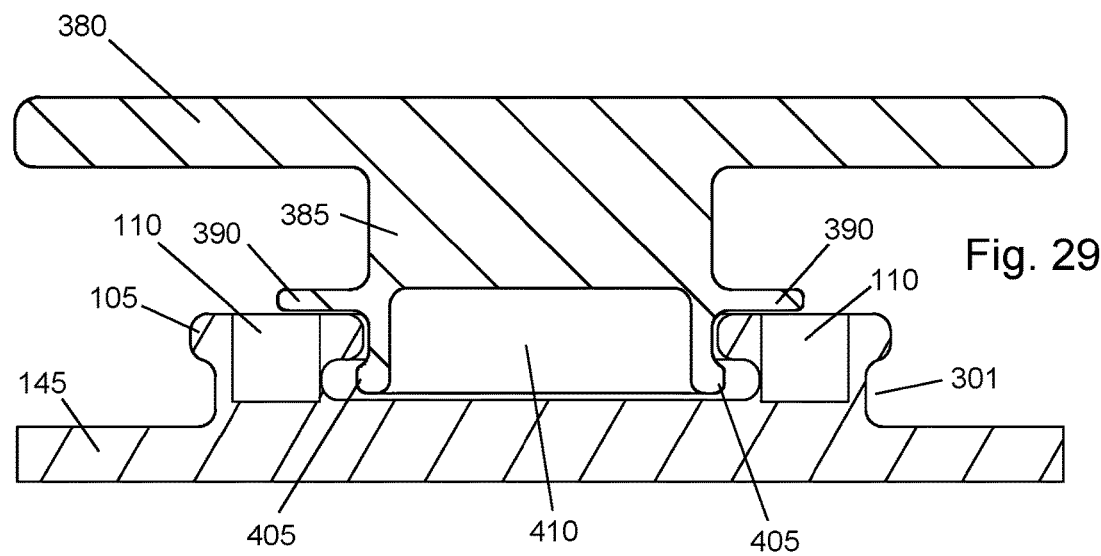
FIG. 29 is a cross-sectional view of an anchoring device secured to a second embodiment of a clip.

As shown in FIG. 28, the circular top 105 of the vehicle anchorage device is not a true circle and instead has hexagonal sides 415. The hexagonal sides 415 are configured to interact with standard tools, such as an adjustable wrench shown in U.S. Pat. No. D445,656 entitled "Adjustable Wrench" or the hexagonal socket shown in U.S. Pat. No. D477,198 entitled "Socket," the contents of which are both herein incorporated by reference. In other embodiments of the invention, the top may have other shapes such as square, oval, or octagonal. Additionally, in addition to the top portion of the anchorage device potentially having a shape that is not a true circle, the middle and bottom portions (e.g., 130 and 145) may have non-circular shapes such as hexagonal, oval, octagonal, square, or rhomboid. As shown in FIG. 29, the lower section 390 of the clip at least partially obscures the holes 110 in the circular top 105 of the vehicle anchorage device.

As can be seen in FIGS. 27 and 29, the diameter of the circular top 105 relative to the diameter of the lower portion 145 is quite variable. In FIG. 27, the diameter of the circular top 105 is almost equal to the diameter of the lower portion 145 such that a significant circular pocket 301 is formed for receiving and securing the liner. In contrast, FIG. 29 shows a circular top 105 that is substantially smaller than the lower portion 145 (e.g., the circular top 105 is less than 70% the diameter of the lower portion 145) such that the circular pocket 301 is significantly smaller than the one shown in FIG. 27. The smaller pocket 301 FIG. 29 would allow for easier removal of the liner from the vehicle anchorage device while the larger pocket 301 of FIG. 27 would create a more permanent connection between the liner and the anchorage device. The size of the pocket may be further varied based on the expected frequency with which the liner will be removed from the vehicle anchorage device.

Figure 30:
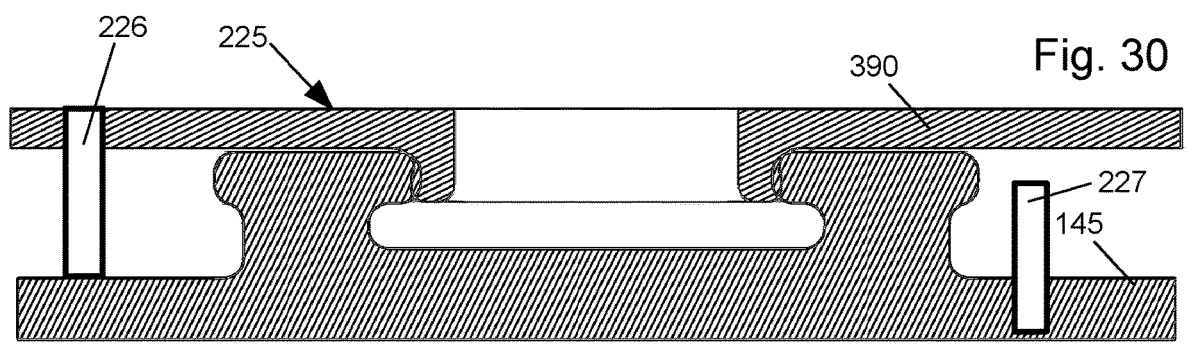
FIG. 30 is a cross-sectional view of an anchoring device secured to a third embodiment of a clip.
Figure 34:
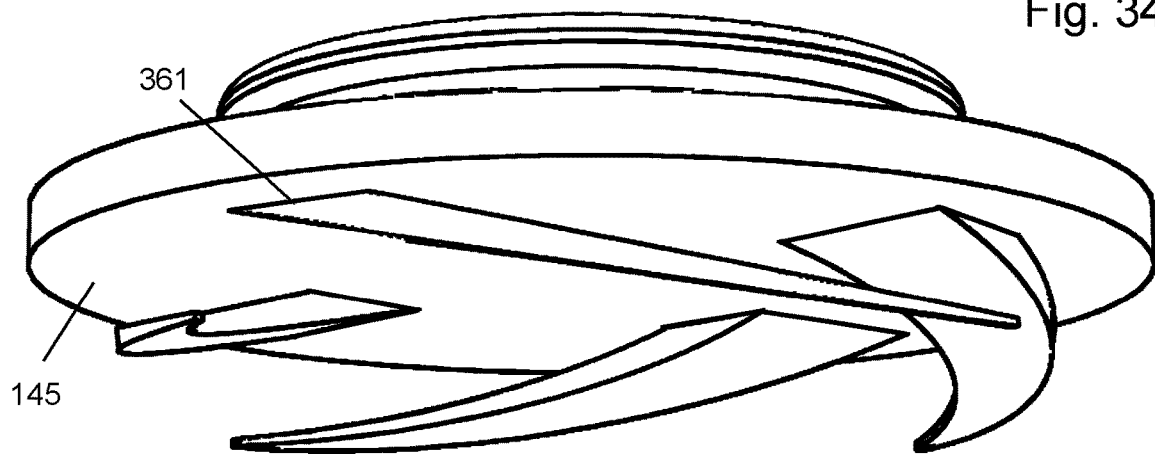
FIG. 34 is a perspective view of an anchoring device with tapering triangular tines.

FIGS. 30 and 31 illustrate an example of a clip 225 without the top 380 and middle sections 385 shown in the previous clips. Without the top 380 and middle sections 385, the clip 225 cannot utilize the pocket 395 for securing the fabric insert and another style of connection is utilized. In the examples of FIGS. 30 and 31, the lower section 390 is larger than the previous examples and may provide a larger surface area for an adhesive based connection between the clip and the fabric insert. Alternatively, as shown in FIG. 30, the lower section 390 of clip 225 may cooperate with the lower portion 145 of the vehicle anchorage device to create a singular pocket for securing both the fabric insert and the liner. In the example shown in FIG. 30, the diameter of the lower section 390 is approximately equal to the diameter of the lower portion 145. FIG. 30 also illustrates an example of an additional component 226 connecting the liner (not shown) to the clip. In one embodiment the additional component 226 is a locking ring, a locking stud, or a locking pin. In one embodiment, the locking ring, stud, or pin passes through the clip and also through an aperture in the liner. In another embodiment, the locking pin is screwed through the clip and compresses the liner to prevent the clip from moving relative the liner. Like the additional component 226 in the clip 225, the lower portion 145 may include a locking structure 227 that secures the liner to the lower portion. In one embodiment the locking structure 227 is a locking ring, a locking stud, or a locking pin.

In FIGS. 26-31, the protrusion of the clip is shown secured into the central aperture of the anchorage device. In other embodiments of the invention, the clip includes an aperture, and the anchorage device has a protrusion that is secured within the aperture of the clip.

FIGS. 32-40 illustrate various configurations of tines 165 on a vehicle anchorage device. FIG. 32 shows tines 165 having a tapering cylindrical cross section with a downward slanting tip 420. FIG. 33 shows tines 165 having a tapering rectangular cross section with downward slanting tips 420. The embodiment of FIG. 33*a* also includes reverse needles 425 that extend down from the lower portion 145 and are encircled by the tines. The reverse needles 425 do not extend as far below the lower portion 145 as the free ends 170 of the tines 165. As shown in FIG. 33*b*, the reverse needles 425 are evenly distributed about the lower side of the lower portion 145. Each of the reverse needles 425 has a swept long face 430 and a short face 435 with the long face generally being oriented in the same direction as the free end 170 of the tines 165. When the vehicle anchorage device is rotated in the OEM floor well, the swept long face 430 of the reverse tine 165 engages the carpeting the OEM floor well and provides for easy insertion of the anchorage device. In contrast, when the anchorage device is removed, the blunt short face 435 of the reverse needle engages the OEM carpeting and hinders removal of the anchorage device. The reverse needles effectively act as ratcheting mechanisms that allow for easy insertion of the anchorage device while hindering removal of the anchorage device. In other embodiments of the invention, the tines are barbed, octagonal, spiral, hexagonal, triangular, pentagonal, or heptagonal.

Figure 35:
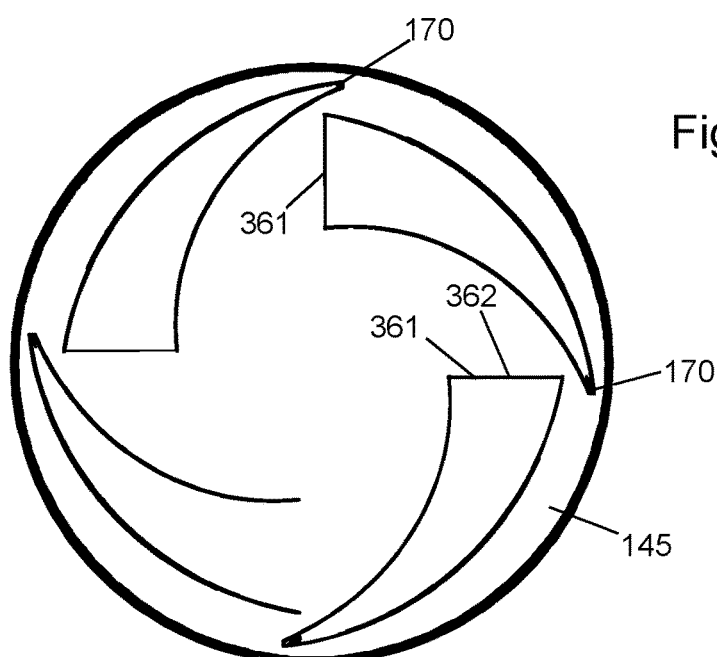
FIG. 35 is a plan view of an anchoring device with outwardly extending tines.
Figure 36:
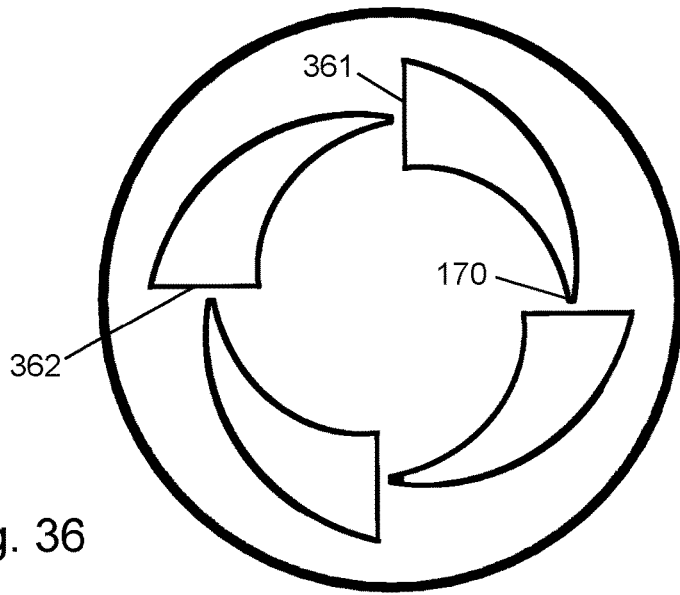
FIG. 36 is a plan view of an anchoring device with inwardly extending tines.

FIGS. 34-40 illustrate examples of tines 165 with rectangular cross sections where the widths of the tines 165 greatly exceed the heights of the tines 165 for at least part of the tine. By having a substantially greater width near the attachment point 361, the tines are substantially more resistant to deflection or deformation as they are inserted into the carpeting of an OEM footwell. In FIG. 35, the free ends 170 of the tines are outward of the attachment point 361, while in FIG. 36, the free ends 170 of the tines are inward of the attachment point 361 as measured along a radius from the center of the lower portion 145. The attachment points 361 are areas rather than points, and for the purposes of inward/outward position, a free end is herein defined to be outward of the attachment point if it is outward of the center of the attachment point. Similarly, a free end is herein defined to be inward of the attachment point if it is inward of the center of the attachment point. The center 362 of the attachment point is shown in FIGS. 35 and 36.

Figure 37:
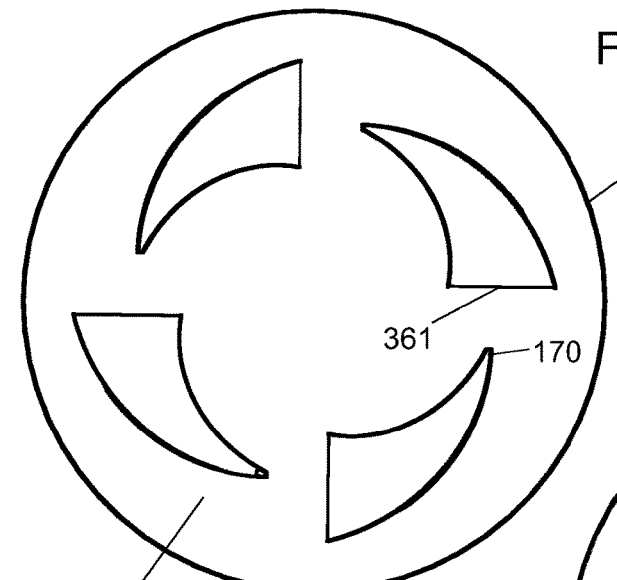
FIG. 37 is a plan view of an anchoring device with spaced apart tines.
Figure 38:
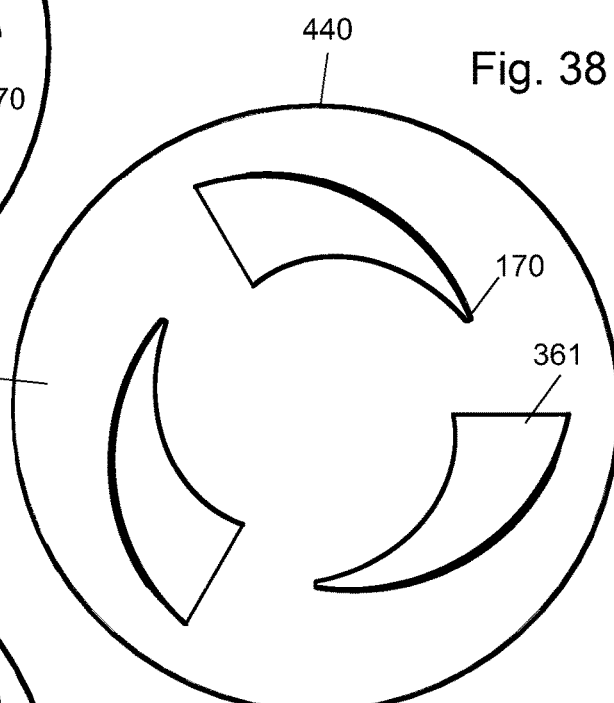
FIG. 38 is a plan view of an anchoring device with spaced apart and inwardly extending tines.
Figure 39:
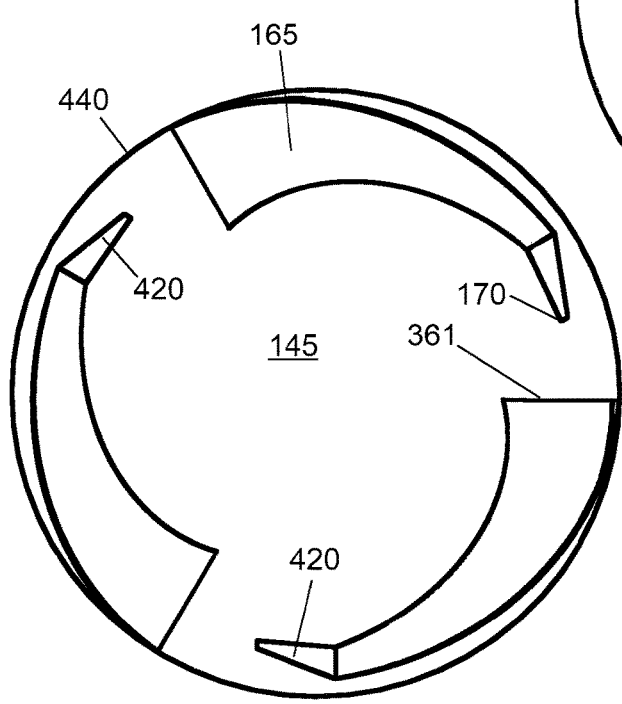
FIG. 39 is a plan view of an anchoring device having tines with downwardly sloping free ends.
Figure 40:
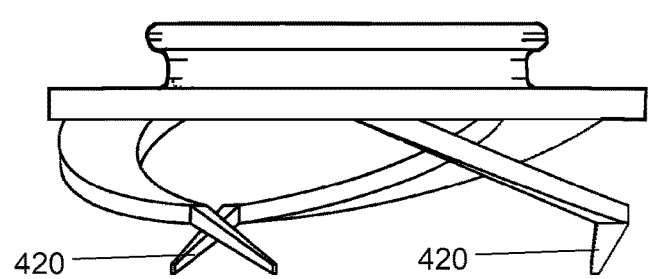
FIG. 40 is an elevational view of an anchoring device having tines with downwardly sloping free ends.

FIGS. 37-40 illustrate examples of vehicle anchorage devices having tines 165 that are spaced apart from each other such that the attachment points 361 and free ends 170 are not adjacent to each other. In FIGS. 37 and 38, the centers of the attachment points are located significantly inward of the outer circumference 440 of the lower portion 145, while in FIG. 39, the tines 165 are attached directly adjacent to the outer circumference 440. By decreasing the number of tines, or by spacing them out, the case by which the vehicle attachment device is inserted into the OEM vehicle footwell can be adjusted. Similarly, by moving the tines inward from the outer circumference 440, the amount of leverage available to rotate the tines is increased thereby increasing the case of insertion. Conversely, while case of insertion may be increased, the holding power of the anchorage device may also be decreased. Based on characteristics of the OEM footwell (e.g., vinyl or carpet, carpet pile thickness, etc.), anchorages with varying characteristics may be used.

Figure 41:
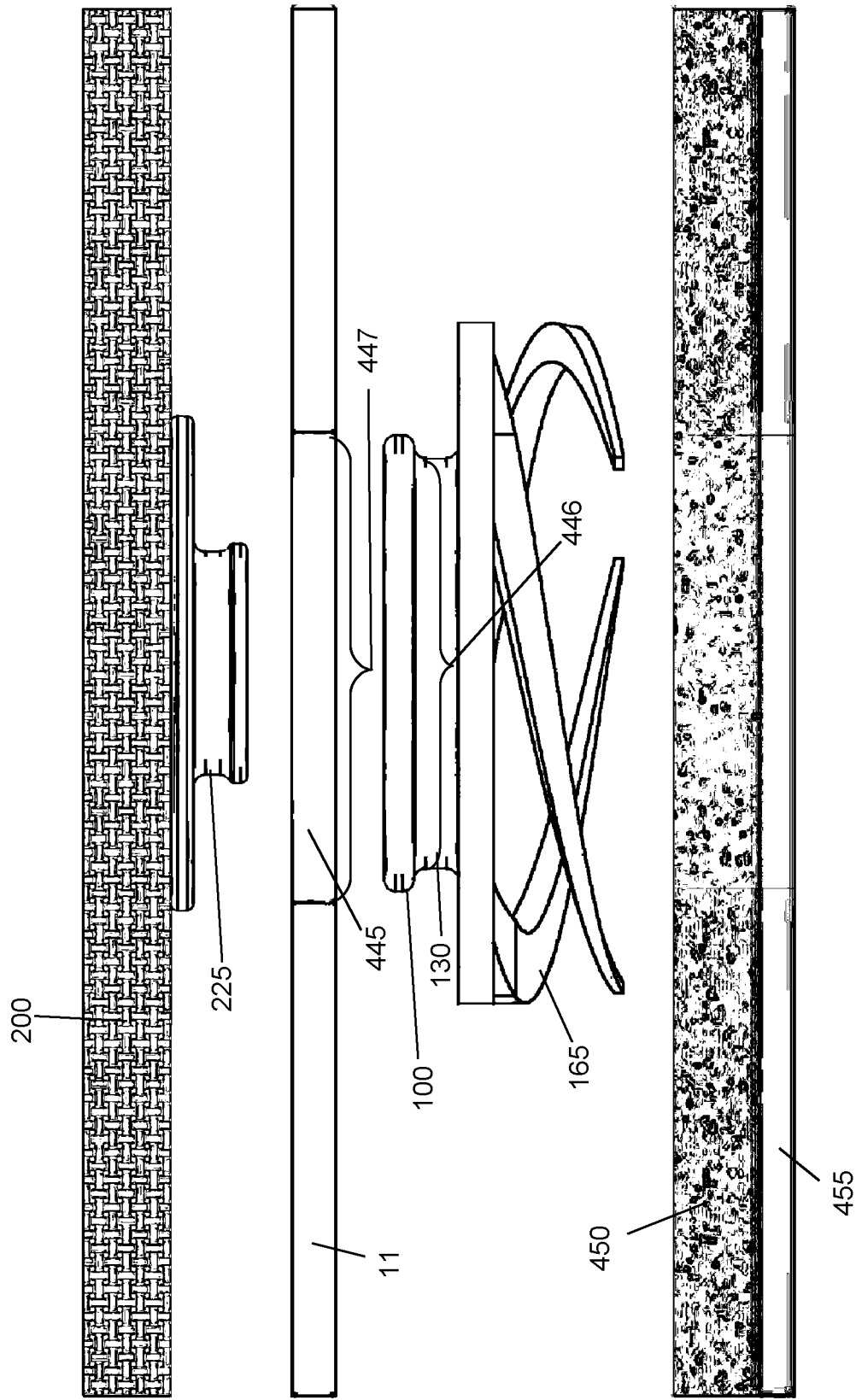
FIG. 41 is an elevational exploded view of a fabric insert, clip, liner, anchoring device, and OEM flooring.
Figure 42:
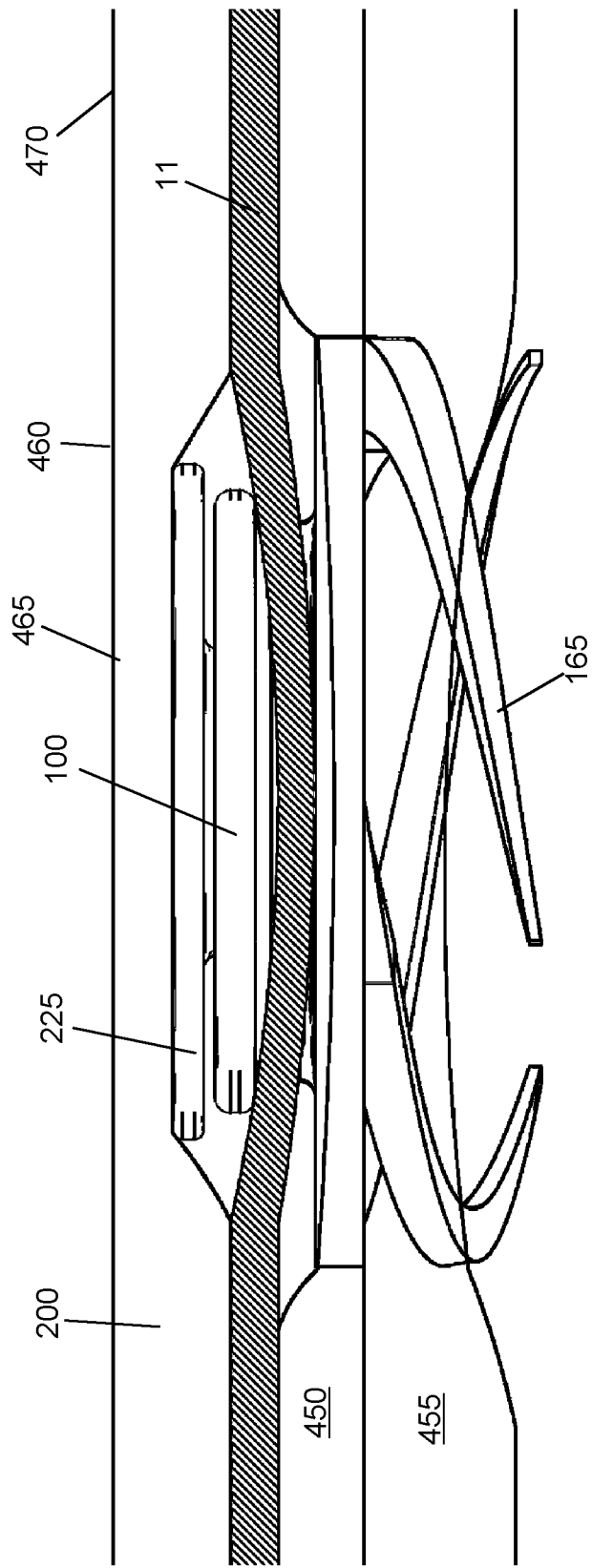
FIG. 42 is an elevational view of a fabric insert, clip, liner, anchoring device, and OEM flooring.

FIGS. 41 and 42 illustrate exploded and side views of a vehicle floor covering system 10 secured to an OEM vehicle footwell. The machine washable fabric insert 200 is secured above the clip 225. The clip 225 and the top part of the vehicle anchorage device 100 pass through the holes 445 in the liner 11.

In one embodiment of the invention, the width 446 of the central portion 130 of the anchorage device 100 is equal to the diameter 447 of the hole 445 or opening. In another embodiment of the invention, the width 446 of the central portion 130 is within 10% of the of the diameter 447 of the hole 445. For example, if the diameter 447 of the hole 445 was one inch, the width 446 of the central portion 130 would be between 0.9 and 1.1 inches.

As shown in FIG. 42, an additional connector 202 may be used to further secure the machine washable fabric insert 200 to the liner 11. In one embodiment, the additional connector 202 is an adhesive (e.g., double-sided tape) while in other embodiments the additional connector employs magnetic, friction, compression, or torsional locking to secure the insert 200 to the liner 11. For example, the additional connector may comprise a button snap with one part fastened to both the liner 11 and the other part fastened to the fabric insert 200. The additional connector 202 could comprise a magnet secured to the insert 200 and a complimentary ferrous piece secured to the liner. In another embodiment, complimentary hook-and-loop fabric fasteners form the additional connector 202.

The tines 165 engage and compress the OEM carpet 450 and may extend down to the OEM insulation or carpet base 455. As can be seen in FIG. 42, due to the lower profile of the vehicle anchorage device, the top surface of the fabric insert 200 is at the same elevation at a point 465 directly above the anchorage device as a point 470 away from the anchorage device. In one embodiment of the invention, the average elevation at point 465 is within $\frac{1}{20}^{th}$ of an inch of the average elevational position away from the vehicle anchorage device (e.g., at point 470).

FIGS. 43-45 illustrate a hair-clip style anchoring device 500 having first and second combs 505 with a plurality of tapered blades 510 secured to parallel heads 515. The blades 510 are pushed through a block 520 having a plurality of apertures 525. The apertures define angled paths through the block 520 that push the blades 510 towards each other as shown in FIG. 45 and secure the hair-clip style anchoring device 500 to a carpet or mesh. The block 510 may include features like the central aperture (e.g., 115 in FIG. 2) for securing clips to the block 510.

Figure 46:
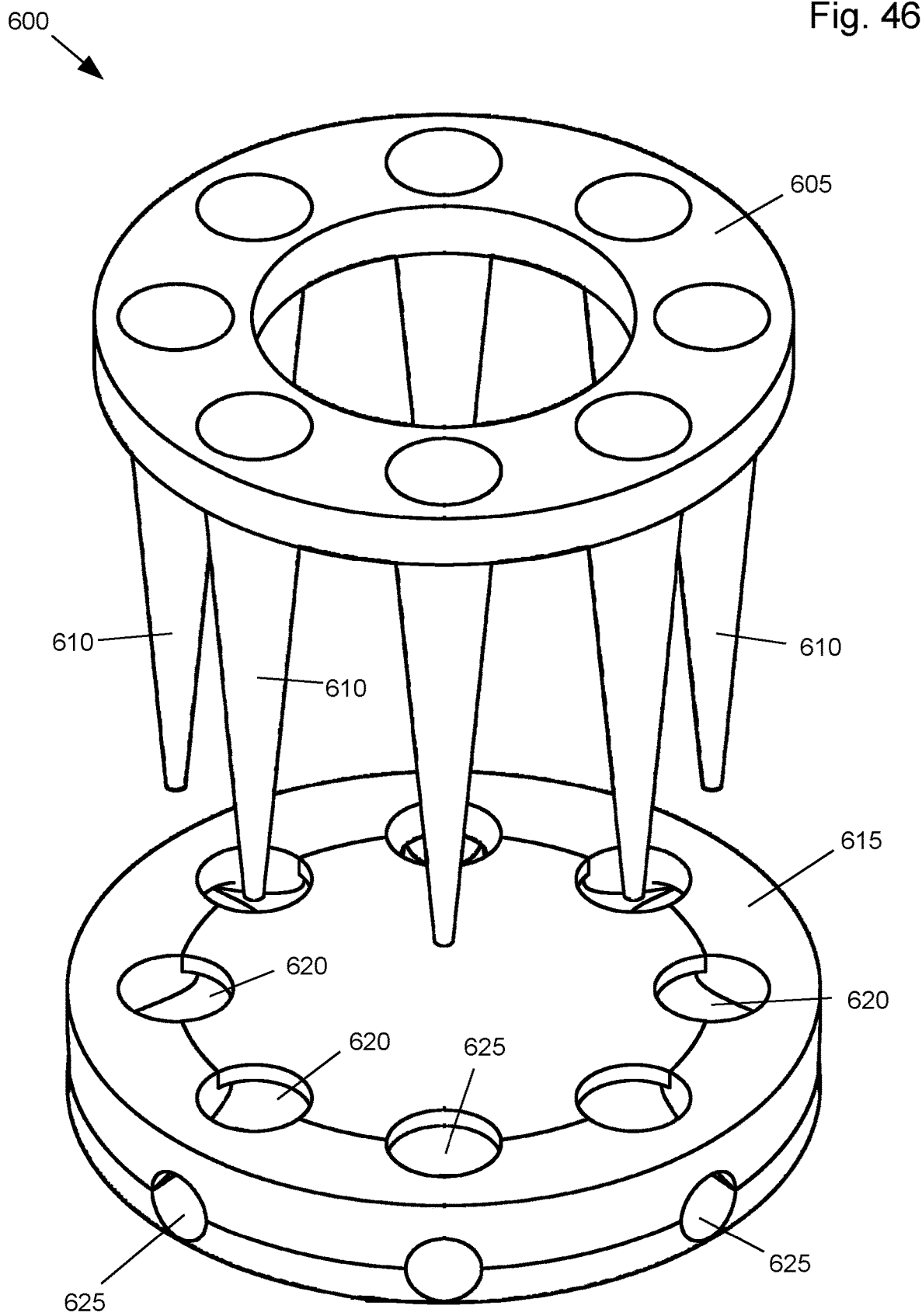
FIG. 46 is a perspective view of an anchoring device with starburst style tines.
Figure 47:
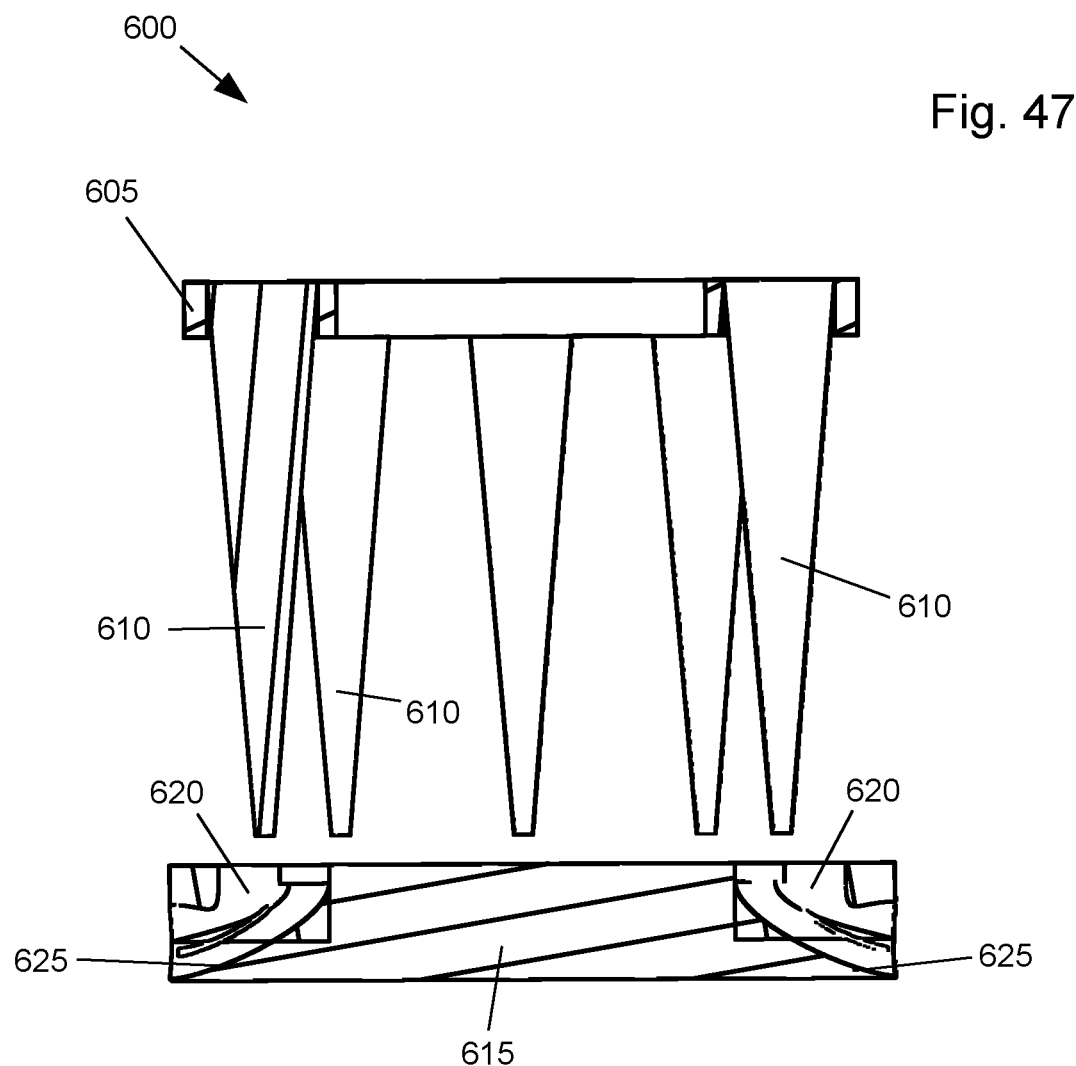
FIG. 47 is an elevational view of an anchoring device with starburst style tines.

FIGS. 46-47 illustrate a starburst style anchoring device 600 having a ring 605 with a plurality of tapered blades 610 parallelly extending down from the ring 605. The blades 610 are sufficiently flexible that they can be bent outward such that the ring 605 and blades 610 form a starburst shape. The anchoring device 600 includes a block 615 having a plurality of holes 620 having deflection surfaces 625. To engage the anchoring device 600, the blades 610 are pushed through the holes 620 where they contact and are pushed outward by the deflection surfaces 625 resulting in a starburst shape of the anchoring device. In the OEM footwell, the blades 610 engage with the OEM carpeting and secure the anchoring device 600 in place. The block 615 may include features like the central aperture (e.g., 115 in FIG. 2) for securing clips to the block 615.

Figure 48:
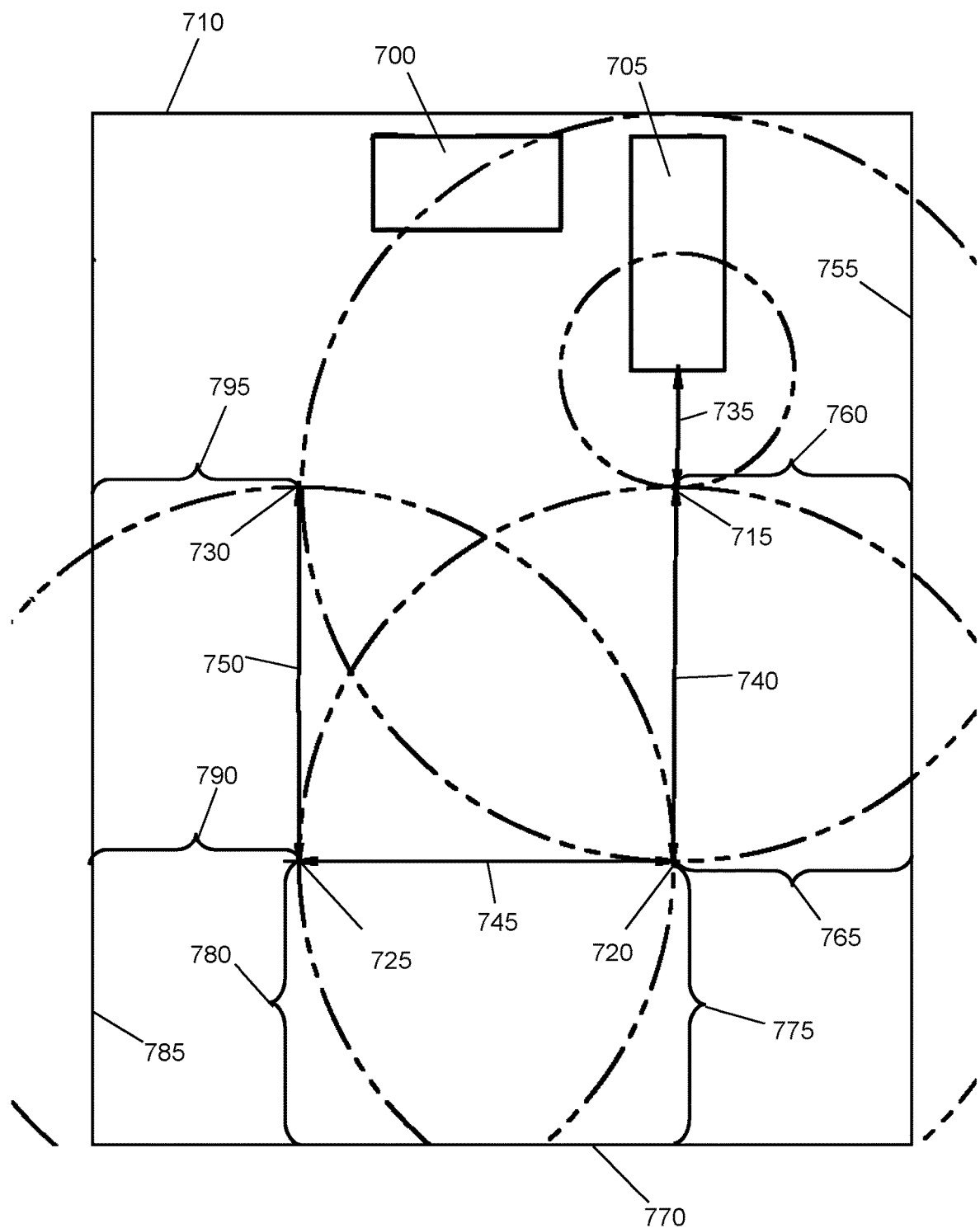
FIG. 48 is a plan view of anchoring devices secured to a liner in an OEM footwell with a gas pedal and a brake pedal.

FIG. 48 illustrates the spacing of holes or openings, adapted to receive vehicle anchorage devices, in the liner of a vehicle floor covering system. Shown are a brake pedal 700, a gas pedal 705, a central panel of a liner 710, and first through fourth holes (715, 720, 725, 730) in the liner adapted to receive vehicle anchorage devices. The first hole 715 is separated from the gas pedal location by a first distance 735, the second hole 720 is separated from the first hole 715 by a second distance 740 and the third hole 725 by a third distance 745, and the fourth hole 730 is separated from the third hole 725 by a fourth distance 750. Additionally, the first hole 715 is separated from the first side 755 of the liner by a fifth distance 760. The second hole is separated from the first side 755 by a sixth distance 765 and a rear side 770 of the liner by a seventh distance 775. The third hole 725 is separated from the rear side 770 by an eighth distance 780 and a second side 785 of the liner by a ninth distance 790. The fourth hole 730 is separated from the second side 785 by a tenth distance 795. The table below lists the distances (in inches) of various embodiments along with the ranges for each distance among the embodiments.

|  | Embodiment | | | | | | | | |
| --- | --- | --- | --- | --- | --- | --- | --- | --- | --- |
|  | #1 | #2 | #3 | #4 | #5 | #6 | #7 | #8 | Range |
| Distance 1, 735 | 3.5 | 2.8 | 3.6 | 2.8 | 5.3 | 2.5 | 2.8 | 1.0 | 1.0-5.3 |
| Distance 2, 740 | 5.6 | 10.3 | 9.2 | 9.3 | 9.7 | 8.0 | 9.3 | 10.5 | 5.6-10.5 |
| Distance 3, 745 | 5.8 | 14.0 | 16.7 | 7.8 | 5.2 | 8.0 | 7.8 | 8.0 | 5.2-14.0 |
| Distance 4, 750 | 5.5 | 10.3 | 8.8 | 7.3 | 6.9 | 8.0 | 7.3 | 10.5 | 5.5-10.5 |
| Distance 5, 760 | 3.1 | 2.0 | 2.6 | 2.2 | 1.3 | 8.1 | 6.2 | 4.5 | 1.3-8.1 |
| Distance 6, 765 | 2.1 | 2.0 | 0.7 | 0.8 | 2.4 | 8.1 | 4.8 | 4.5 | 0.8-8.1 |
| Distance 7, 775 | 5.3 | 1.1 | 1.2 | 2.2 | 1.6 | 12.0 | 6.2 | 10.7 | 1.1-12.0 |
| Distance 8, 780 | 4.4 | 1.1 | 1.1 | 3.5 | 4.5 | 12.0 | 7.5 | 10.7 | 1.1-4.5 |
| Distance 9, 790 | 2.1 | 1.9 | 8.7 | 1.5 | 3.5 | 4.5 | 5.5 | 3.8 | 1.5-5.5 |
| Distance 10, 795 | 1.5 | 1.9 | 1.1 | 1.9 | 1.3 | 4.5 | 5.9 | 3.8 | 1.1-5.9 |

In one embodiment, the holes or openings in the liner adapted to receive the anchorage devices are circular openings with a first diameter, however the holes or openings may also be other shapes. For example, in one embodiment the hole or opening is a square while in other embodiments the openings in the liner are round, round with a large diameter, round with a small diameter, oval square, octagonal, hexagonal, a multifaceted shape such as a star, or a combination of multiple shapes. The width of an opening in the liner is herein defined to be the separation of the two most distant points on the perimeter of the opening. The center or center point of an opening is herein defined to be the centroid of the perimeter of the opening (i.e., the arithmetic mean position of all the points on the perimeter).

In one embodiment of the invention, the distances between the clips 225 in the fabric insert 200 (e.g., FIG. 12) are matched to the distances (740, 745, and 750) between the holes (715, 720, 725, and 730). In one embodiment of the invention, the spacings or distances between the clips (or holes in the liner) are within $\frac{1}{10}^{th}$ of an inch of the distances (740, 745, and 750), and in another embodiment of the invention the spacings or distances between the clips (or holes in the liner) are within $\frac{1}{100}^{th}$ of an inch of the distances (740, 745, and 750). In yet another embodiment of the invention, the two spacings or distances between the clips in the fabric insert are within $\frac{1}{100}^{th}$ of an inch of two of the distances (740, 745, and 750), and third spacing between clips is within $\frac{1}{10}^{th}$ of an inch of the other distance (740, 745, or 750). For the purposes of measuring distances between the clips and/or holes in the liner, their spacings/distances are herein defined to be measured from one center point of the clip/hole to the center point of another clip/hole or edge/boundary.

In one embodiment of the invention, the liner 11 has a sufficiently rigid construction, and the apertures in the liner are precisely dimensioned relative to the circular top 105 of the anchorage device such that at least 50 Newtons of force (approximately the downward force exerted by two gallons of gasoline) is required to push the circular top 105 through the aperture. In another embodiment, 100 Newtons of force is required to push the circular top 105 through the aperture (i.e., stretch the aperture enough to allow the circular top 105 to pass through). Due to the rigidity of the liner and precise fit of the anchorage device in the apertures, an extremely precise alignment of the anchorage devices and apertures is required.

Figure 49:
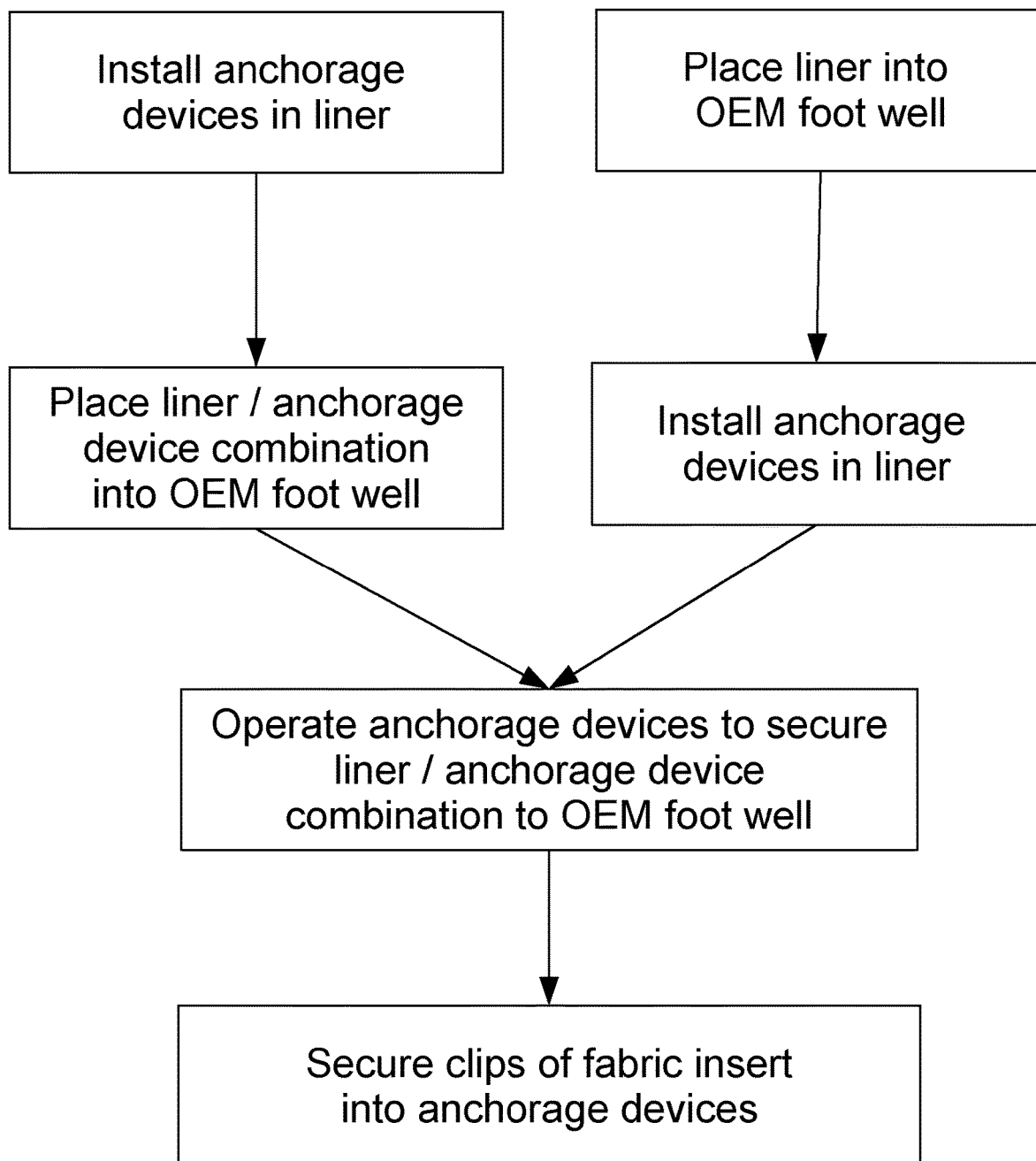
FIG. 49 illustrates a method of installing a vehicle floor covering system.
Figure 50:
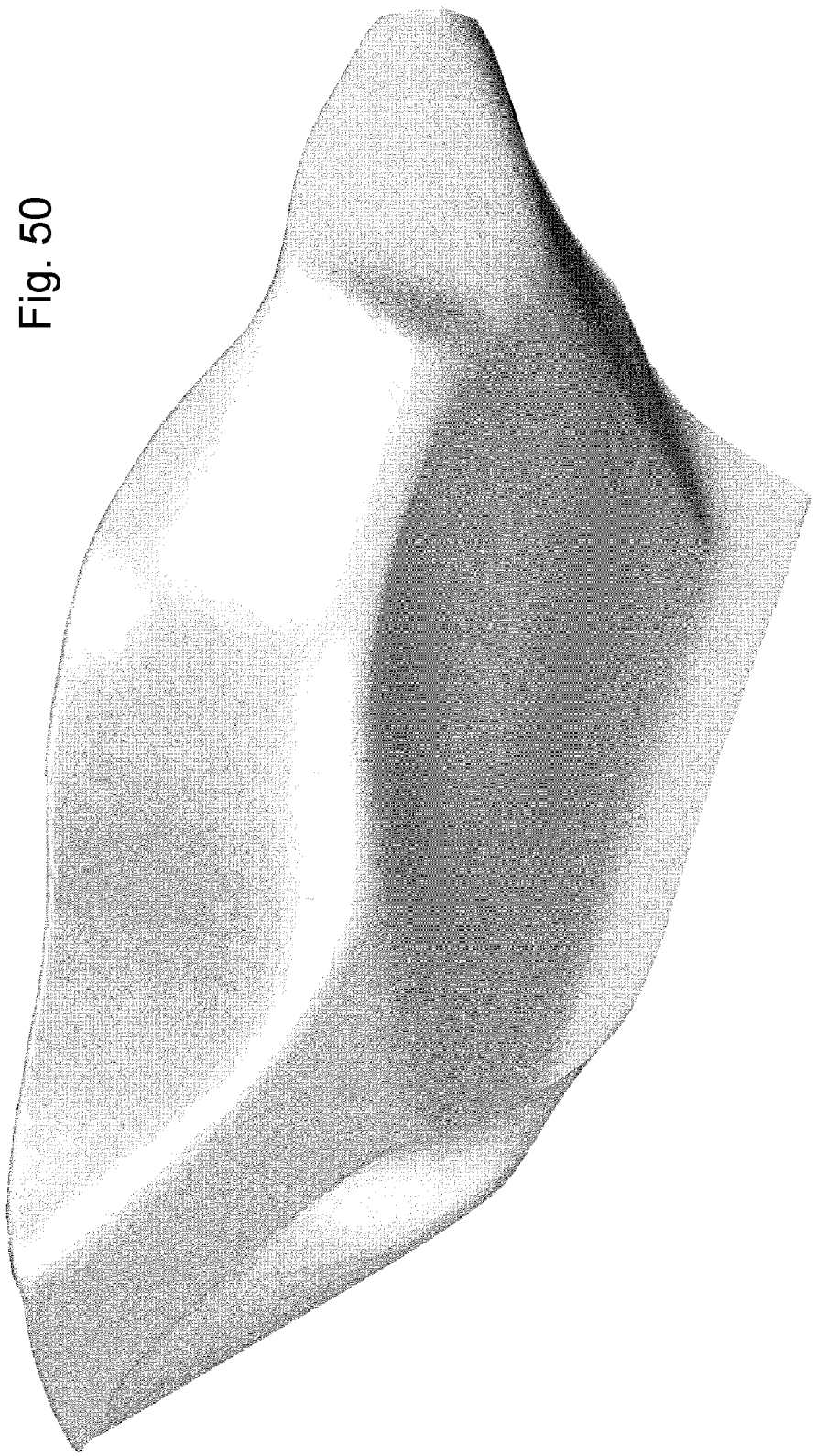
FIG. 50 is a first perspective view of a smooth liner for a vehicle floor covering system.
Figure 51:
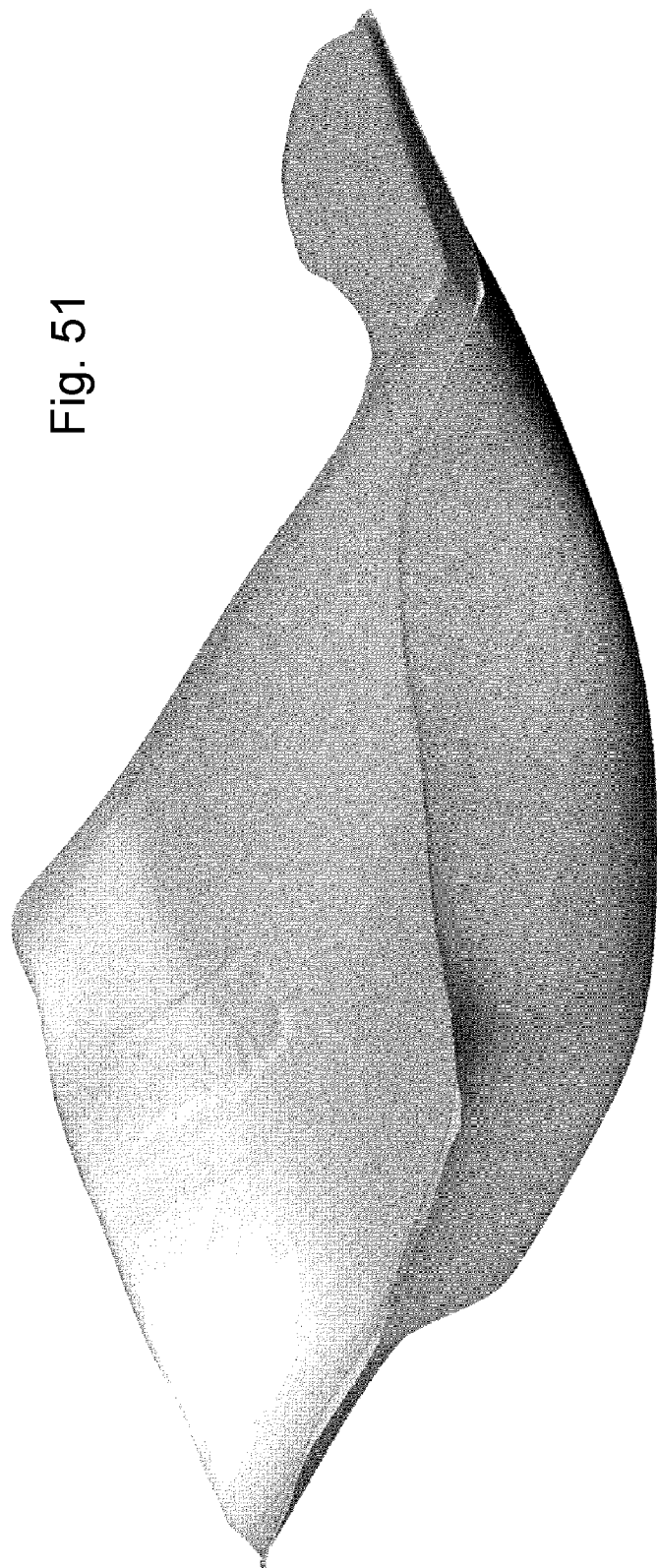
FIG. 51 is a second perspective view of a smooth liner for a vehicle floor covering system.
Figure 52:
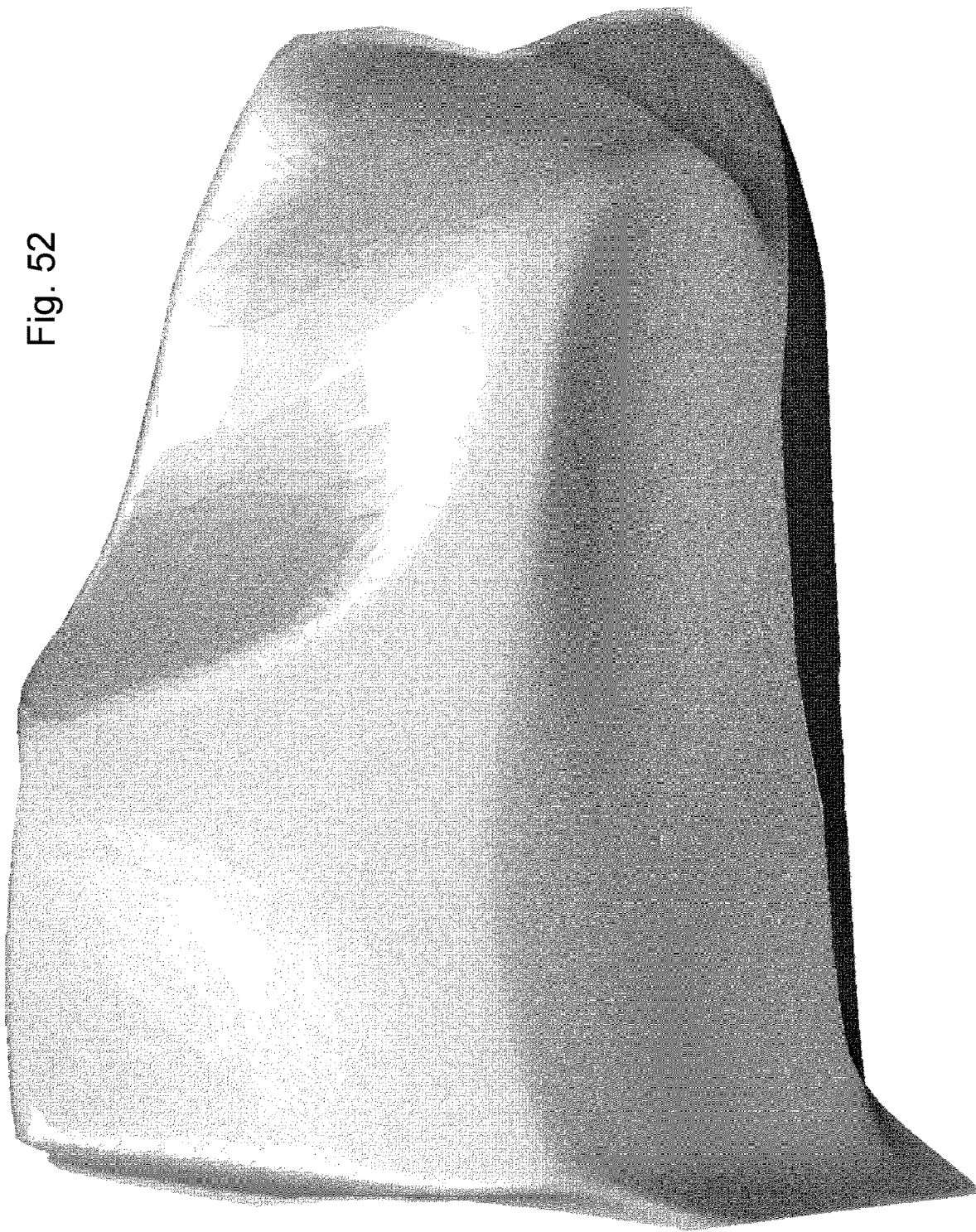
FIG. 52 is a rear perspective view of a smooth liner for a vehicle floor covering system.
Figure 53:
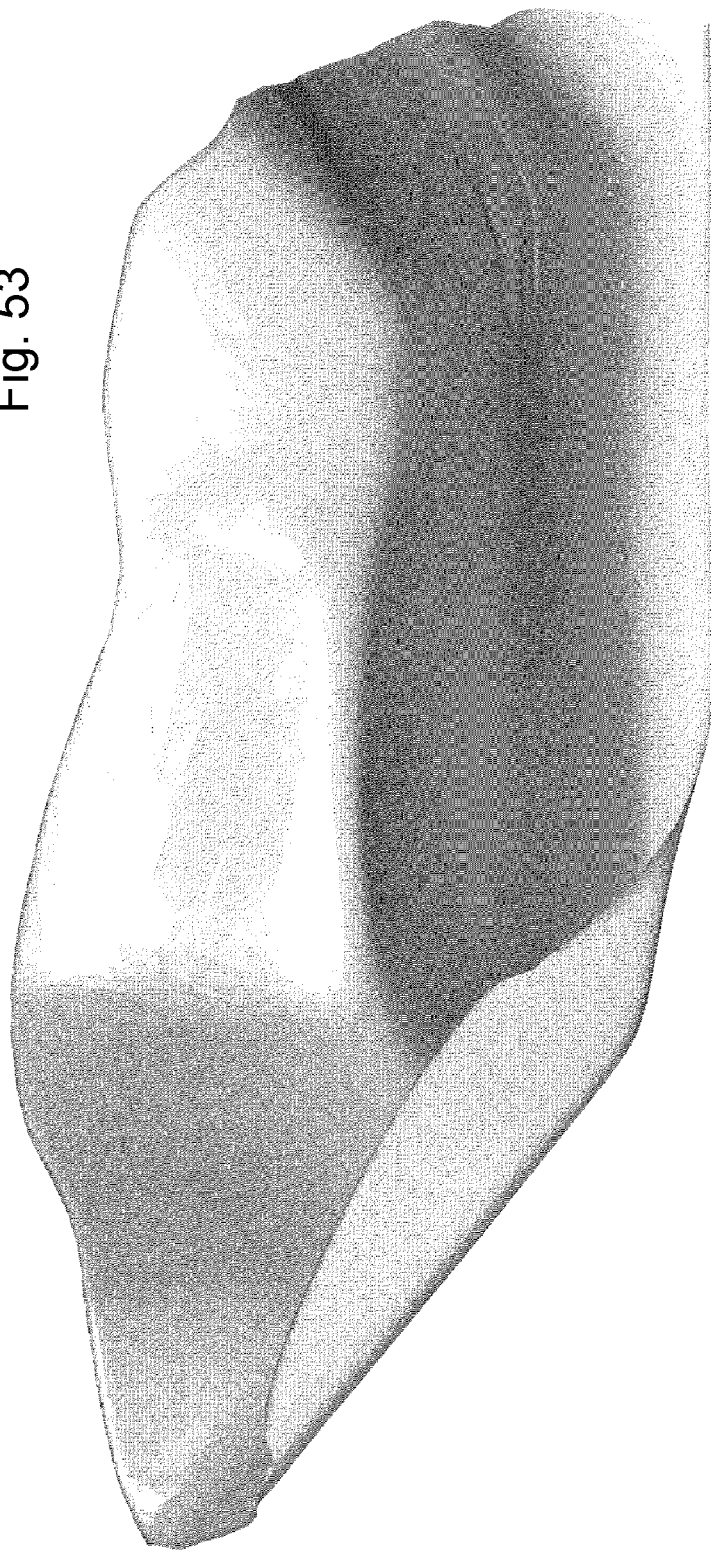
FIG. 53 is a first side perspective view of a smooth liner for a vehicle floor covering system.
Figure 54:
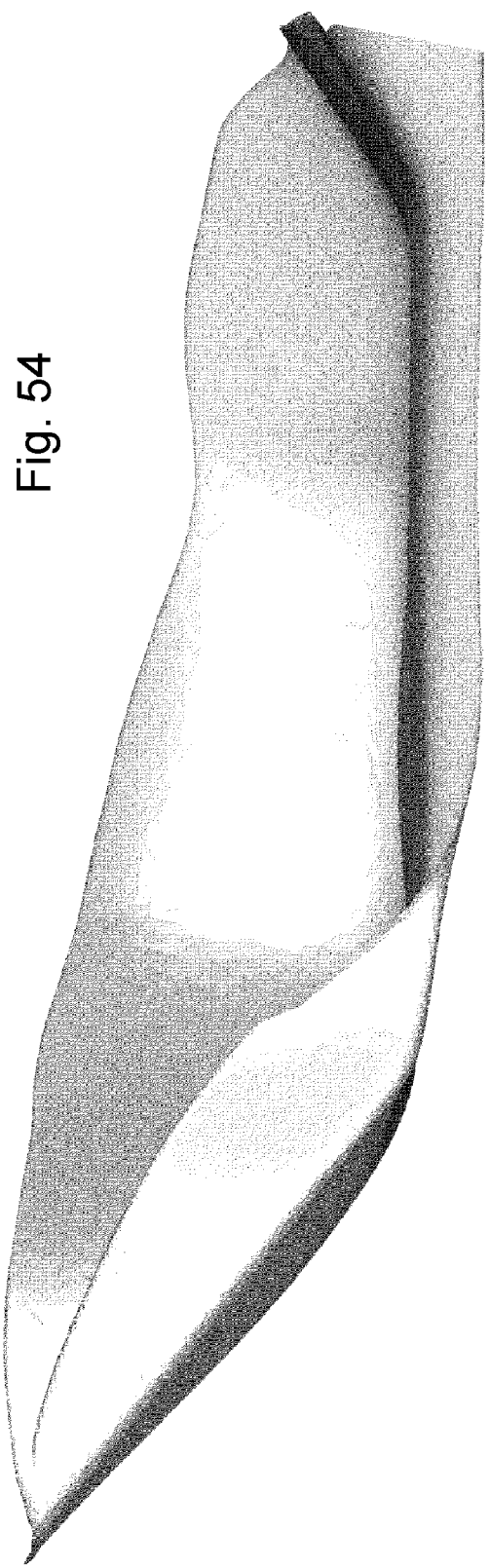
FIG. 54 is a second side perspective view of a smooth liner for a vehicle floor covering system.
Figure 55:
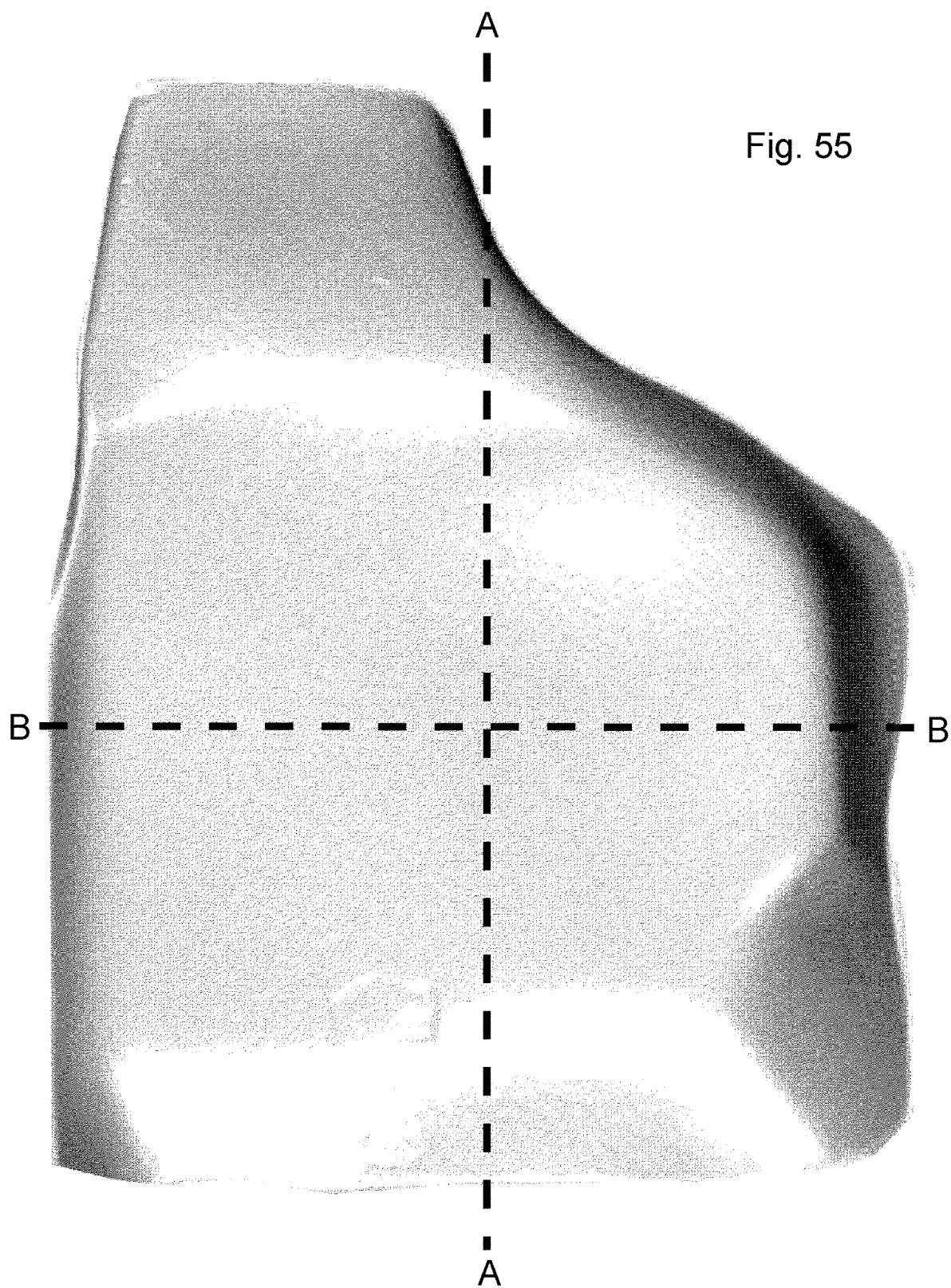
FIG. 55 is a bottom plan view of a smooth liner for a vehicle floor covering system.
Figure 56:
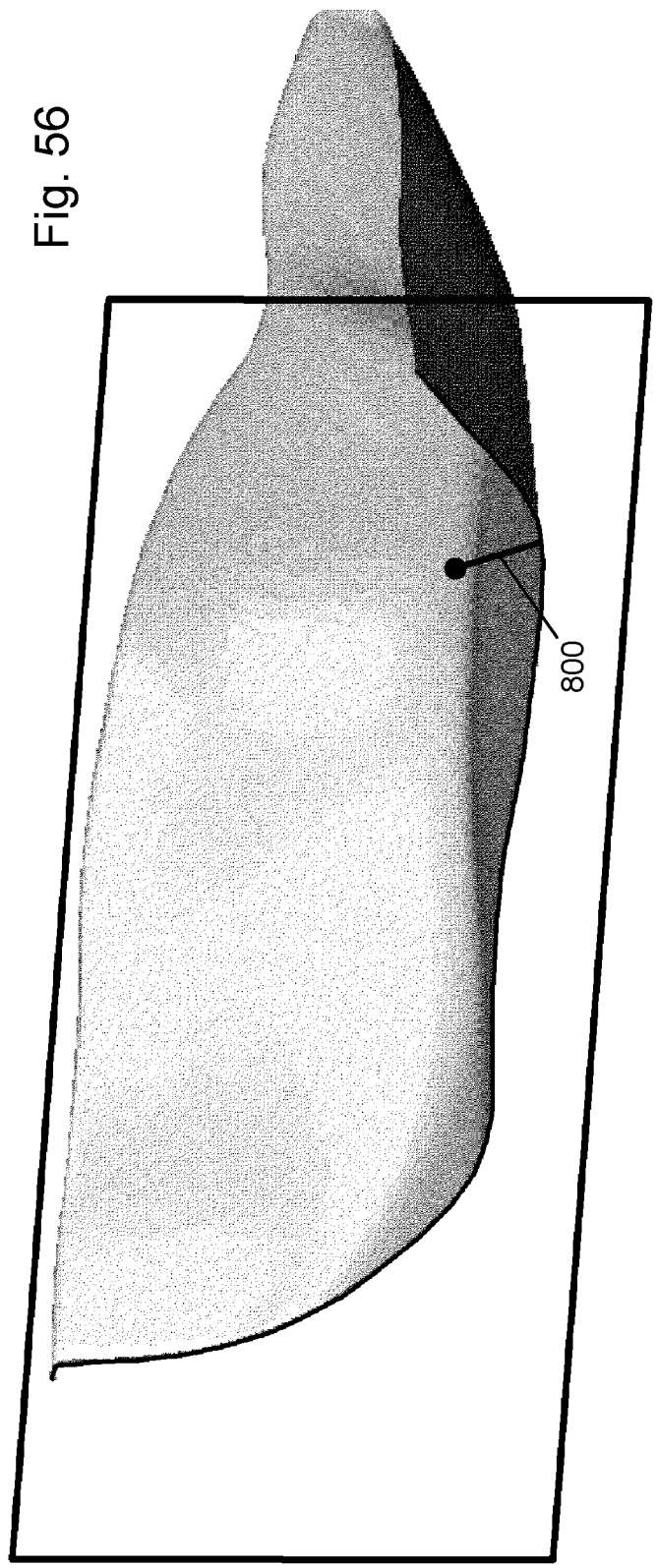
FIG. 56 is a cross-sectional view of a smooth liner for a vehicle floor covering system through A-A in FIG. 55.
Figure 57:
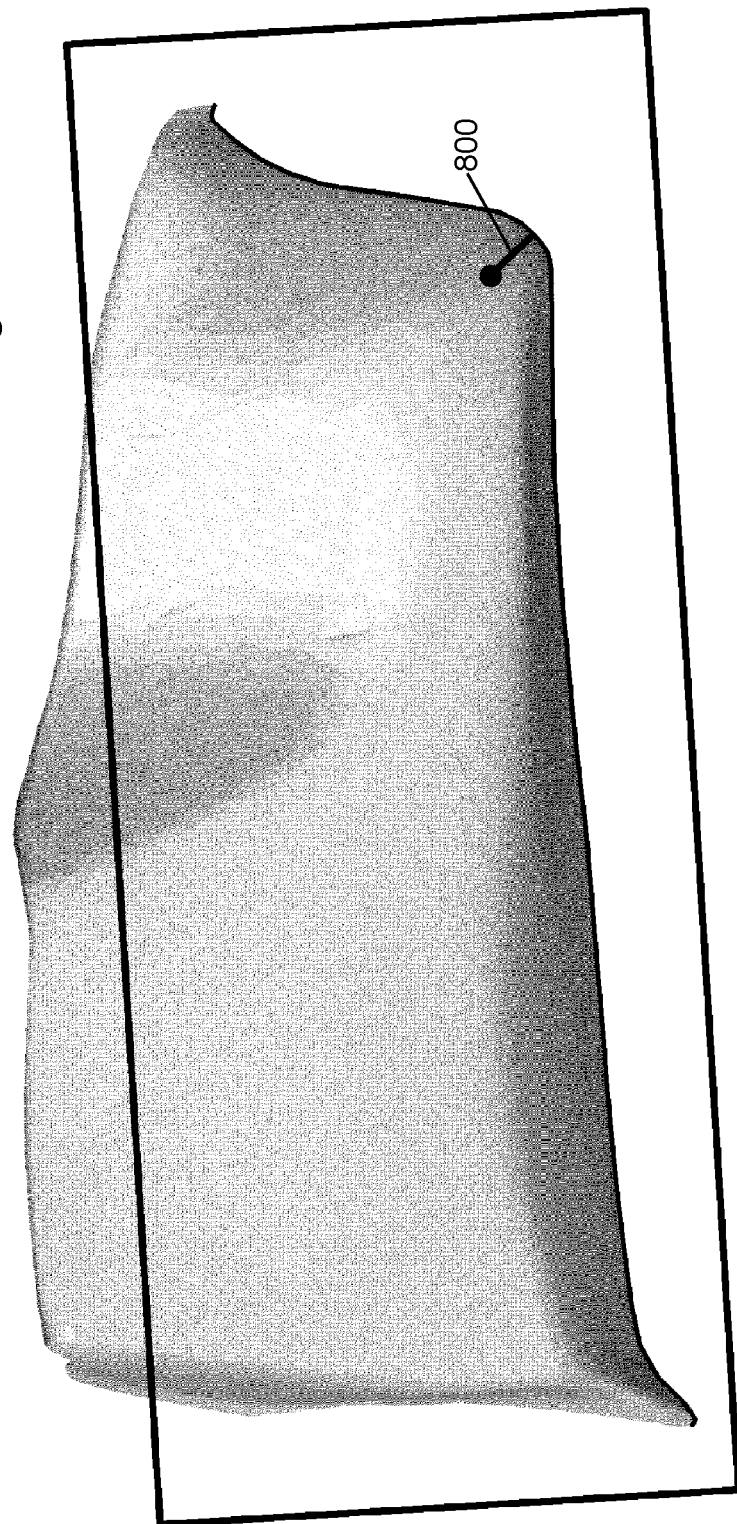
FIG. 57 is a cross-sectional view of a smooth liner for a vehicle floor covering system through B-B in FIG. 55.

As a result of the precise alignment of the holes in the liner and the clips in the fabric insert, it will generally be required to use the liner as a template when installing the vehicle floor covering system into an OEM footwell. FIG. 49 illustrates the general installation process. First, the anchorage devices are secured or placed into the holes of the liner. In one embodiment of the invention, this step is done by the manufacturer of the vehicle floor covering system and in another embodiment the end user is responsible for positioning the anchorage devices in the liner. In anchorage devices with particularly deep circular pockets, it is expected that the manufacture will likely insert the anchorage devices into the liner apertures. The liner/anchorage device combination is then placed into the footwell. Alternatively, the liner could be first be placed into the OEM footwell and then the anchorage devices are placed into the liner that is already in the OEM footwell.

In the next step, the anchorage devices are operated to secure the liner/anchorage device combination to the OEM footwell. In some embodiments of the invention, tools such as those shown in FIGS. 18-22 are used to operate the anchorage devices. Finally, the fabric insert is placed on the liner and the clips in the fabric insert are secured to their respective anchorage devices.

FIGS. 50-57 illustrate a liner with smooth contours configured to align with the contours of an OEM footwell. In the illustrated examples, the transitions on the smooth liner have radiuses of curvature 800 that are at least one quarter of an inch. In other embodiments of the invention, the radiuses of curvature 800 on the transitions (e.g., the transition from central panel to sidewall) are at least half an inch. In another embodiment, the radiuses of curvature 800 are at least one eighth of an inch throughout the liner so that no curve or angled area on the liner has a sharper angle than a sphere with a radius of one eighth of an inch.

In FIGS. 50-57, the openings in the liner for the anchorage devices are not shown, but the openings may be located in the lower, generally flat, portion of the liner or in the sidewalls surrounding the lower portion of the liner.

At least FIGS. 3, 4, 5, 9, 13, 14, 19, 21, 22, 23, 24-25, 26, 29, 30, 31, 33*a*, and 40 are drawn to scale; however, the inventor contemplates that the proportions of the structures shown in these drawings may be modified and still be within the scope of the present invention.

The inventor contemplates several alterations and improvements to the disclosed invention. Other alterations, variations, and combinations are possible that fall within the scope of the present invention. Although the preferred embodiment of the present invention has been described, those skilled in the art will recognize other modifications that may be made that would nonetheless fall within the scope of the present invention.

The invention claimed is:

1. A floor covering system for covering a vehicle foot well, the floor covering system comprising:
a liner having
a front side wall and a rear side wall, a first opening and a second opening, each of the first and second openings having a width and
fully extending through the liner from a top surface of the liner to a bottom surface of the liner,
wherein the first opening is separated from the second opening by a first distance,
wherein the first opening is separated from the rear side wall by a second distance, and
the first distance and the second distance are each at least six inches; and
a first anchorage device configured to be inserted into at least one of the first opening and the second opening, the first anchorage device having
a central portion with a central width located above a bottom portion with a bottom width,
the bottom width being at least 25% larger than the central width,
at least two tines helically extending down from the bottom portion, and
each of the tines has a portion located directly between another tine and the bottom portion.

2. The floor covering system of claim 1 further comprising
a second anchorage device configured to be inserted into at least one of the first opening and the second opening; and
a fabric insert having a first clip and a second clip, each of the clips having a portion configured to be received and secured into at least one of the first anchorage device and the second anchorage device, wherein the first clip is separated from the second clip by a third distance, and the third distance is within $\frac{1}{4}^{th}$ of an inch of the first distance.

3. The floor covering system of claim 1 wherein the top surface of the liner is undistorted fully planar within one inch of both the first opening and the second opening.

4. The floor covering system of claim 1 wherein the the first opening is at least twelve inches from a rear edge of the liner.

5. The floor covering system of claim 1 further comprising
a fabric insert with
a first clip spaced apart from a second clip by a third distance,
the second clip spaced apart from a third clip by a fourth distance,
the third clip spaced apart from the first clip by a fifth distance, and
the first clip having a lower portion configured to be secured into a top portion of the first anchorage device; and
the liner having
a third opening spaced apart from the second opening by a sixth distance,
the first opening spaced apart from the third opening by a seventh distance;
wherein
the third distance is within $\frac{1}{4}$ of an inch of the first distance,
the fourth distance is within $\frac{1}{4}$ of an inch of the sixth distance, and
the fifth distance is within $\frac{1}{4}$ of an inch of the seventh distance.

6. The floor covering system of claim 1 further comprising a fabric insert with a first clip having a lower portion configured to be secured into a top portion of the first anchorage device;
the liner having a central region bounded by an outer perimeter; and
the fabric insert is configured to cover 50-99% of a top surface of the central region.

7. The floor covering system of claim 1 further comprising the bottom width is between 1.5 and 2.5 times the central width.

8. A vehicle with a floor covering system and an accelerator pedal in a foot well, the floor covering system comprising:
a liner having
a front side wall and a rear side wall,
a first opening and a second opening, each of the first and second openings having a width and
fully extending through the liner from a top surface of the liner to a bottom surface of the liner,
wherein the first opening is separated from the second opening by a first distance,
wherein the first opening is separated from the rear side wall by a second distance, and
the first distance and the second distance are each at least six inches; and
a first anchorage device configured to be inserted into at least one of the first opening and the second opening, the first anchorage device having
a central portion with a central width located above a bottom portion with a bottom width,
the bottom width being at least 25% larger than the central width,
at least two tines helically extending down from the bottom portion, and
each of the tines has a portion located directly between another tine and the bottom portion.

9. The vehicle of claim 8 wherein
the vehicle foot well has a first width;
the liner has a central region bounded in part by the front side wall and the rear side wall;
the central region of the liner has a second width; and
the second width of the central region of the liner is greater than the first width of the vehicle foot well.

10. The vehicle of claim 8 wherein the first opening and the first anchorage device are configured to be within five inches of an accelerator pedal.

11. The vehicle of claim 8 further comprising
a second anchorage device configured to be inserted into at least one of the first opening and the second opening; and
a fabric insert having a first clip and a second clip, each of the clips having a portion configured to be received and secured into at least one of the first anchorage device and the second anchorage device, wherein the first clip is separated from the second clip by a third distance, and the third distance is within $\frac{1}{4}^{th}$ of an inch of the first distance.

12. The vehicle of claim 11 wherein
the top surface of the liner is undistorted fully planar within one inch of both the first opening and the second opening.

13. The vehicle of claim 8 wherein
both the first and second openings are circular.

14. A floor covering system for covering a vehicle foot well, the floor covering system comprising:
a liner having
a front side wall and a rear side wall, a first opening and a second opening, each of the first and second openings having a width and
fully extending through the liner from a top surface of the liner to a bottom surface of the liner,
wherein the first opening is separated from the second opening by a first distance,
wherein the first opening is separated from the rear side wall by a second distance, and
the first distance and the second distance are each at least six inches; and
a first anchorage device configured to be inserted into at least one of the first opening and the second opening, the first anchorage device having
a central portion with a central width located above a bottom portion with a bottom width,
the bottom width being at least 25% larger than the central width,
at least two tines helically extending down from the bottom portion, and wherein the central portion and the bottom portion are integrally formed and
the central portion of the first anchorage device has a pocket adapted to receive the liner.

15. The floor covering system of claim 14 wherein the central portion of the first anchorage device includes a hole adapted to receive a torsional device.

16. The floor covering system of claim 14 wherein the top surface of the liner is undistorted fully planar within one inch of both the first opening and the second opening.

17. The floor covering system of claim 14 further comprising
a fabric insert with
a first clip spaced apart from a second clip by a third distance,
the second clip spaced apart from a third clip by a fourth distance,
the third clip spaced apart from the first clip by a fifth distance, and
the first clip having a lower portion configured to be secured into a top portion of the first anchorage device; and
the liner having
a third opening spaced apart from the second opening by a sixth distance,
the first opening spaced apart from the third opening by a seventh distance;
wherein
the third distance is within ¼ of an inch of the first distance,
the fourth distance is within ¼ of an inch of the sixth distance, and
the fifth distance is within ¼ of an inch of the seventh distance.

18. The floor covering system of claim 14 further comprising
a fabric insert with a first clip having a lower portion configured to be secured into a top portion of the first anchorage device;
the liner having a central region bounded by an outer perimeter; and
the fabric insert is configured to cover 50-99% of a top surface of the central region.

\* \* \* \* \*